US012429752B2

(12) United States Patent
Griggs

(10) Patent No.: US 12,429,752 B2
(45) Date of Patent: Sep. 30, 2025

(54) REPLACEABLE LENS MODULE HAVING A SPRING PLATE

(71) Applicant: GoPro, Inc., San Mateo, CA (US)

(72) Inventor: Ian Copeland Griggs, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 205 days.

(21) Appl. No.: 18/224,728

(22) Filed: Jul. 21, 2023

(65) Prior Publication Data

US 2025/0028229 A1    Jan. 23, 2025

(51) Int. Cl.
*G03B 17/14*    (2021.01)
*G02B 7/14*     (2021.01)
*G03B 17/56*    (2021.01)

(52) U.S. Cl.
CPC .............. *G03B 17/14* (2013.01); *G02B 7/14* (2013.01); *G03B 17/565* (2013.01)

(58) Field of Classification Search
CPC ...... G02B 7/022; G02B 7/026; G03B 11/043; G03B 17/14; G03B 17/565
See application file for complete search history.

(56) References Cited

U.S. PATENT DOCUMENTS

| | | | |
|---|---|---|---|
| 5,483,384 A * | 1/1996 | Takizawa | G02B 7/021 359/830 |
| 9,477,064 B1 | 10/2016 | Chen | |
| 9,609,195 B2 | 3/2017 | Czepowicz | |
| 10,701,249 B1 | 6/2020 | Guo | |
| 10,969,660 B2 | 4/2021 | Cotoros | |
| 11,425,286 B2 | 8/2022 | Vitale | |
| 11,606,488 B2 | 3/2023 | Vitale | |
| 11,647,270 B2 | 5/2023 | Vitale | |
| 2002/0130963 A1 | 9/2002 | Gelbard | |
| 2007/0133977 A1 | 6/2007 | Mayumi | |

(Continued)

FOREIGN PATENT DOCUMENTS

| CN | 216595712 U | 5/2022 |
|---|---|---|
| KR | 100733047 B1 | 9/2006 |

(Continued)

OTHER PUBLICATIONS

International Search Report for Application No. PCT/US2019/058061, dated Jan. 30, 2020, 9 pages.

*Primary Examiner* — Leon W Rhodes, Jr.
(74) *Attorney, Agent, or Firm* — Young Basile Hanlon & MacFarlane, P.C.

(57) ABSTRACT

The present teachings provide an image capture device that includes a lens barrel disposed in a body of the image capture device. A bayonet is coupled to the lens barrel and includes one or more fingers that project outward from the bayonet. The image capture device also includes a replaceable lens module configured to releasably couple to the bayonet. The replaceable lens module includes a retaining ring, a lens positioned in an opening of the retaining ring, and a spring plate coupled to an interior surface of the retaining ring. The spring plate is configured to engage the one or more fingers of the bayonet to releasably couple the replaceable lens module to the bayonet. Additionally, the spring plate is configured to elastically deform when the spring plate engages the one or more fingers of the bayonet to compress the replaceable lens module towards the lens barrel.

20 Claims, 11 Drawing Sheets

(56) References Cited

U.S. PATENT DOCUMENTS

| | | |
|---|---|---|
| 2010/0165188 A1 | 7/2010 | Jannard |
| 2011/0273777 A1* | 11/2011 | Koyama ............. G03B 11/045 359/823 |
| 2013/0111464 A1 | 5/2013 | Markas |
| 2013/0128104 A1 | 5/2013 | Nunnink |
| 2013/0129335 A1 | 5/2013 | Gainer |
| 2013/0182179 A1 | 7/2013 | Page |
| 2013/0343735 A1 | 12/2013 | Zhang |
| 2014/0098225 A1 | 4/2014 | Rodriguez |
| 2014/0160304 A1 | 6/2014 | Galor |
| 2015/0293430 A1 | 10/2015 | O'Neill |
| 2016/0174408 A1 | 6/2016 | Tolbert |
| 2016/0274338 A1 | 9/2016 | Davies |
| 2016/0349601 A1 | 12/2016 | Kungl |
| 2017/0062303 A1 | 3/2017 | Lee |
| 2017/0064159 A1 | 3/2017 | Lee |
| 2017/0102513 A1 | 4/2017 | Ogata |
| 2017/0111559 A1 | 4/2017 | Abbas |
| 2017/0223239 A1 | 8/2017 | Petty |
| 2018/0143514 A1 | 5/2018 | Campbell |
| 2018/0224717 A1 | 8/2018 | Matsuzawa |
| 2020/0133095 A1 | 4/2020 | Cotoros |
| 2021/0255525 A1 | 8/2021 | Cotoros |
| 2022/0353400 A1 | 11/2022 | Vitale |
| 2022/0400192 A1 | 12/2022 | Vitale |
| 2022/0400196 A1 | 12/2022 | Vitale |
| 2023/0209166 A1 | 6/2023 | Vitale |

FOREIGN PATENT DOCUMENTS

| | | |
|---|---|---|
| KR | 20160015880 A | 2/2016 |
| WO | 2013058469 A1 | 4/2013 |

\* cited by examiner

REPLACEABLE LENS MODULE HAVING A SPRING PLATE

TECHNICAL FIELD

This disclosure relates to an optical system, and more specifically, to an image capture device that includes a replaceable lens module.

BACKGROUND

Typical cameras may include one or more lenses so that images may be taken through the lenses (e.g., using one or more image sensors). The lens(es) may be connected within an image capture device so that alignment of the lens(es) is maintained. The lens(es) may be connected to a frame or to each other so that proper alignment is achieved and maintained. However, the lens(es) may become misaligned when the image capture device is dropped or impacted, thereby rendering the image capture device unable to capture images clearly or accurately. Additionally, if the lens(es) become damaged, it may be difficult to replace the lens(es) individually and may require replacement of the entire image capture device.

SUMMARY

Disclosed herein are implementations of an image capture device that includes a lens barrel, a bayonet, and a replaceable lens module. The lens barrel is disposed in a body of the image capture device. The bayonet is coupled to the lens barrel and includes one or more fingers that project outward from the bayonet. The replaceable lens module is configured to releasably couple to the bayonet. Additionally, the replaceable lens module includes a retaining ring, a lens positioned in an opening of the retaining ring, and a spring plate coupled to an interior surface of the retaining ring. The spring plate is configured to engage the one or more fingers of the bayonet to releasably couple the replaceable lens module to the bayonet. Additionally, the spring plate is configured to elastically deform when the spring plate engages the one or more fingers of the bayonet to compress the replaceable lens module towards the lens barrel.

The implementations disclosed herein may include a spring plate that extends radially inward from the retaining ring towards an optical axis of the lens barrel to engage the one or more fingers of the bayonet. Additionally, the retaining ring may include an axial portion that extends substantially parallel to the optical axis of the lens barrel and a radial portion that extends radially inward towards the optical axis of the lens barrel. The radial portion of the retaining ring may include a retaining flange that at least partially surrounds the opening of the retaining ring. The retaining flange may be configured to contact the lens and position the lens with respect to the lens barrel.

In certain implementations disclosure herein, the spring plate and the retaining may form a channel, and the one or more fingers of the bayonet may be configured to be positioned in the channel when the replaceable lens module is releasably coupled to the bayonet. Additionally, the spring plate may include one or more finger notches, and the one or more fingers of the bayonet may be configured to be inserted into the one or more finger notches to position the one or more fingers in the channel. Furthermore, the replaceable lens module may be configured to axially align the lens of the replaceable lens module and the lens barrel of the image capture device.

Disclosed herein are implementations of an image capture device that includes a lens barrel, a bayonet coupled to the lens barrel, a replaceable lens module, and a seal. The lens barrel is disposed in a body of the image capture device and includes one or more internal lenses disposed in the lens barrel. The replaceable lens module is configured to removably couple to the bayonet. The replaceable lens module includes a retaining ring, an external lens positioned in an opening of the retaining ring, and a spring plate coupled to, or integrally formed with, the retaining. The spring plate is configured to engage the bayonet and elastically deform to create a friction fit between the bayonet and the spring plate. Additionally, the seal is positioned between the retaining ring of the replaceable lens module and the body of the image capture device.

In certain implementations disclosed herein, the replaceable lens module may be movable along and about an optical axis of the lens barrel to couple the replaceable lens module to the bayonet. Additionally, the spring plate may include one or more finger notches, and the one or more finger notches may be configured to align with and receive one or more fingers of the bayonet when the replaceable lens module is moved towards the lens barrel along and about the optical axis. Moreover, the replaceable lens module may further comprise a channel located between the spring plate and the retaining ring, whereby the replaceable lens module may be configured to rotate with respect to the bayonet when the one or more fingers of the bayonet are received by the one or more finger notches of the spring plate to position the one or more fingers in the channel. The channel may include one or more channel stops, and the replaceable lens module may be configured to rotate with respect to the bayonet until the one or more fingers of the bayonet abut the one or more channel stops.

In certain implementations disclosed herein, the seal may be located within a groove of the body of the image capture device. Additionally the retaining ring may include an axial portion that extends parallel to an optical axis of the lens barrel towards the body of the image capture device, whereby the seal may be positioned between the axial portion of the retaining ring and the body of the image capture device. Moreover, the bayonet may include a lens recess configured to receive the external lens of the replaceable lens module.

Disclosed herein are implementations of a replaceable lens module for an image capture device that includes a retaining ring, a replaceable lens, a spring plate, and a seal. An opening is disposed in the retaining ring and the replaceable lens is disposed in the opening. The replaceable lens is configured to be aligned to the optical axis of the lens barrel of the image capture device using the retaining ring. The spring plate extends from the retaining ring and is configured to engage the one or more fingers of the bayonet. Additionally, the seal is compressible between the retaining ring and a body of the image capture device. Furthermore, the spring plate is configured to elastically deform when engaged to the one or more fingers of the bayonet to exert a biasing force on the retaining ring and the seal to retain the replaceable lens between the retaining ring and the lens barrel.

In certain implementations disclosed herein, the spring plate and the one or more fingers may extend towards one another along substantially parallel planes. Additionally, the replaceable lens module may be configured to move towards the bayonet along the optical axis of the lens barrel until the spring plate is positioned axially between the body of the image capture device and the bayonet. Moreover, the retaining ring may be configured to conceal the bayonet of the image capture device from view from a position exterior to the image capture device. Furthermore, the spring plate may include a forward surface and an opposing rearward surface, and the forward surface of the spring plate may be coupled to the retaining ring and may be configured to contact the one or more fingers of the bayonet.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The present teachings provide a device that includes an external lens. The external lens may be part of a replaceable lens module that is configured to connect to an image capture device. The image capture device may include one or more lenses that are fixed within the image capture device (e.g., internal lens integrated with, or coupled to, a lens barrel of the image capture device) and one or more lenses that are removable and/or interchangeable (e.g., the external lens part of the replaceable lens module). The replaceable lens module may be located in front of, of external to, the lens(es) that are fixed within the image capture device. The replaceable lens module, the external lens, or both may be removed from the image capture device for replacement or changing, and then recoupled to the image capture device. The replaceable lens module, the external lens, or both may be completely or partially sealed with respect to the image capture device.

In order for images or videos to be captured, the external lens and the internal lens(es) are aligned along an optical axis. The external lens and the internal lens(es) may be subject to build tolerances that could cause misalignment and negatively impact capture of the images or videos. Additionally, if the image capture device is accidentally dropped or impacted, the external lens may be damaged or misaligned with the internal lens(es), thereby also negatively impacting the capture of the images of the videos. However, the present teachings seek to provide a replaceable lens module where alignment between the internal lens(es) and external lens is proper so that the images or videos captured are clear and complete without distortion. Furthermore, the present teachings seek to provide a replaceable lens module that facilitates easy replacement or changing of the external lens (e.g., to replace a damaged external lens, to interchange the external lens with another type of external lens, etc.) while still ensuring proper alignment between the external lens and the internal lens(es).

Figure 1A:
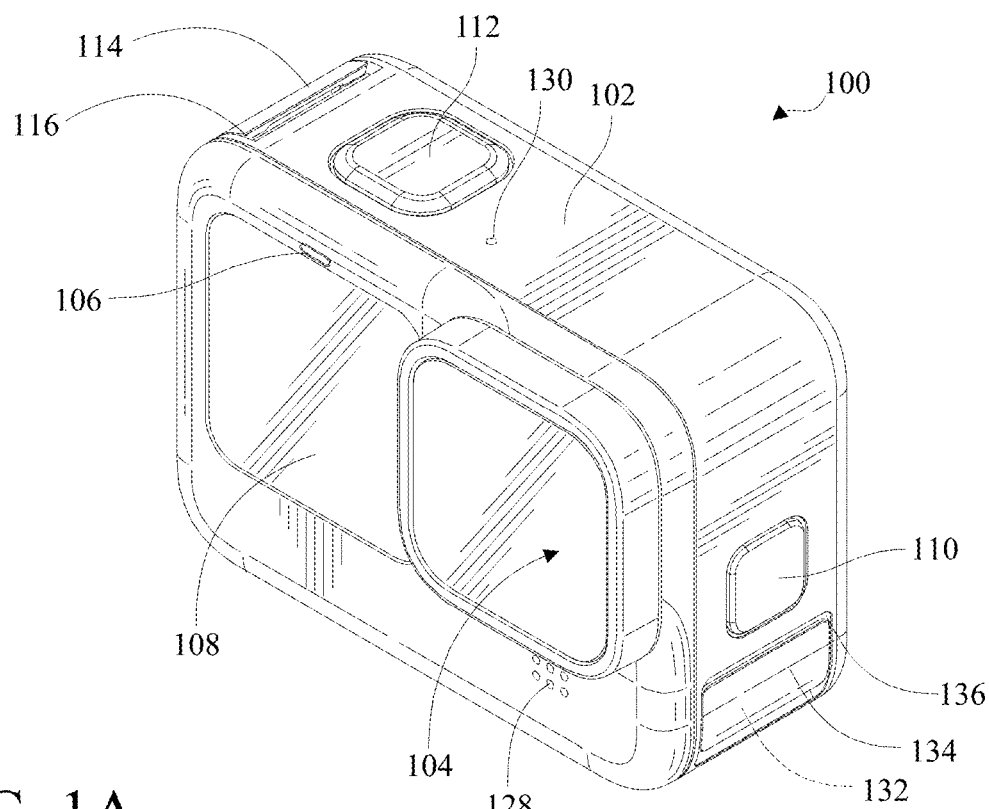
FIGS. 1A-B are isometric views of an example of an image capture apparatus.
Figure 1B:
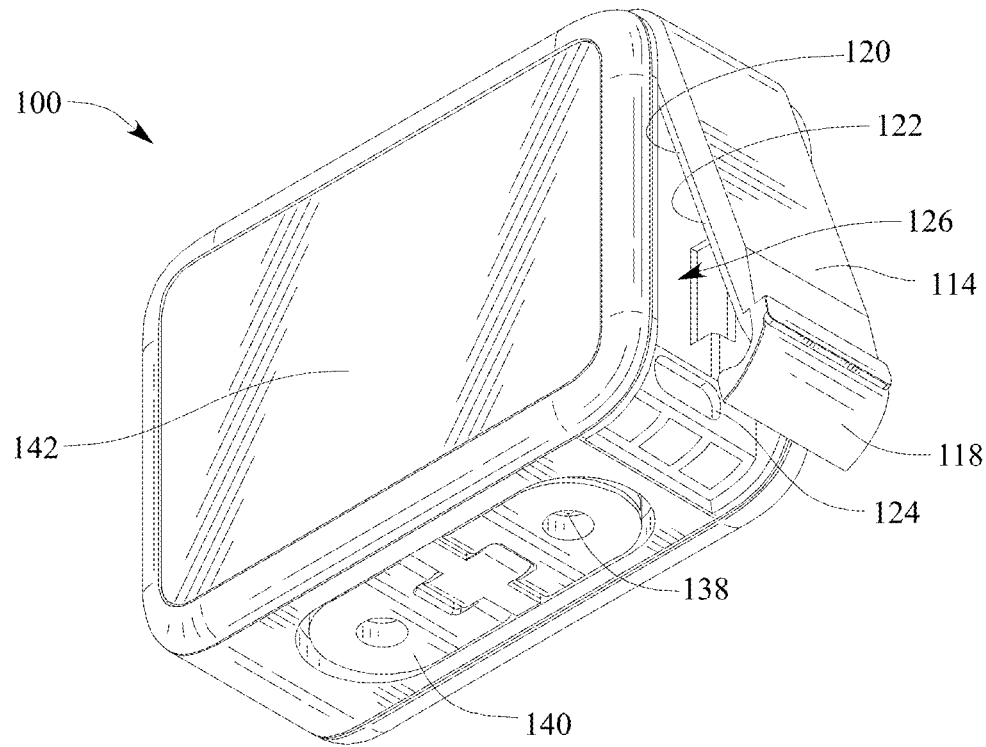
Figure 5:
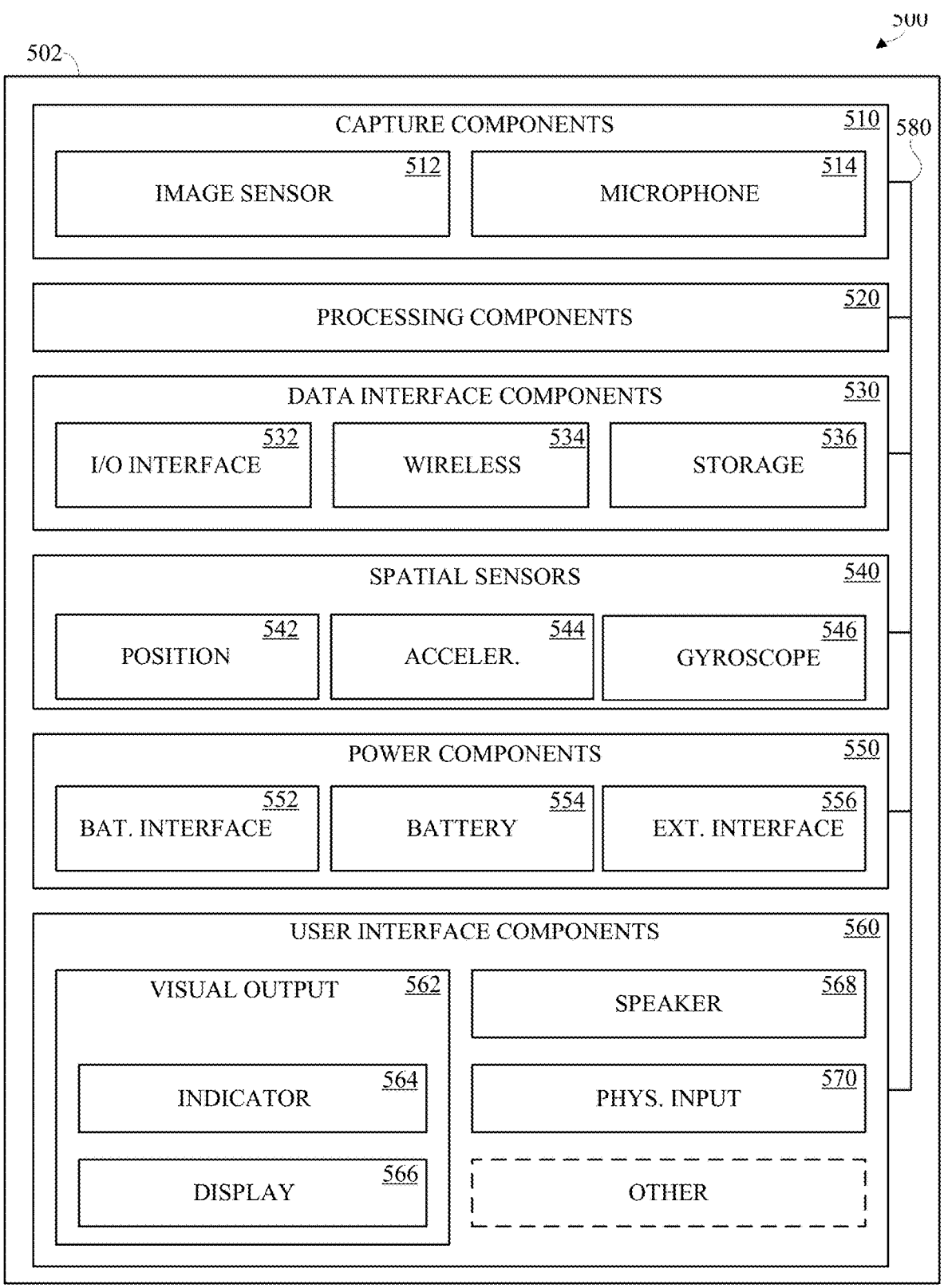
FIG. 5 is a block diagram of electronic components of an image capture apparatus.

FIGS. 1A-B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 138, an interconnect mechanism 140, and a display 142. Although not expressly shown in FIGS. 1A-B, the image capture apparatus 100 includes internal electronics, such as imaging electronics, power electronics, and the like, internal to the body 102 for capturing images and performing other functions of the image capture apparatus 100. An example showing internal electronics is shown in FIG. 5. The arrangement of the components of the image capture apparatus 100 shown in FIGS. 1A-B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used. The image capture device 104 is structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. In some implementations, the display 108 may be omitted or combined with another component of the image capture apparatus 100.

As shown in FIG. 1A, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1A, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. The shutter button 112 may be another type of input device, such as a switch, a toggle, a slider, or a dial. The image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1B, the image capture apparatus 100 includes the door 114 coupled to the body 102, such as using the hinge mechanism 116 (FIG. 1A). The door 114 may be secured to the body 102 using the latch mechanism 118 that releasably engages the body 102 at a position generally opposite the hinge mechanism 116. The door 114 includes the seal 120 and the battery interface 122. Although one door 114 is shown in FIG. 1A, the image capture apparatus 100 may include multiple doors respectively forming respective surfaces of the body 102, or portions thereof. The door 114 may be removable from the body 102 by releasing the latch mechanism 118 from the body 102 and decoupling the hinge mechanism 116 from the body 102.

In FIG. 1B, the door 114 is shown in a partially open position such that the data interface 124 is accessible for communicating with external devices and the battery receptacle 126 is accessible for placement or replacement of a battery. In FIG. 1A, the door 114 is shown in a closed position. In implementations in which the door 114 is in the closed position, the seal 120 engages a flange (not shown) to provide an environmental seal and the battery interface 122 engages the battery (not shown) to secure the battery in the battery receptacle 126.

As shown in FIG. 1B, the image capture apparatus 100 includes the battery receptacle 126 structured to form a portion of an interior surface of the body 102. The battery receptacle 126 includes operative connections for power transfer between the battery and the image capture apparatus 100. In some implementations, the battery receptacle 126 may be omitted. The image capture apparatus 100 may include multiple battery receptacles.

As shown in FIG. 1A, the image capture apparatus 100 includes a first microphone 128 structured on a front surface of the body 102, a second microphone 130 structured on a top surface of the body 102, and a third microphone 132 structured on a side surface of the body 102. The third microphone 132, which may be referred to as a drain microphone and is indicated as hidden in dotted line, is located behind a drain cover 134, surrounded by a drain channel 136, and can drain liquid from audio components of the image capture apparatus 100. The image capture apparatus 100 may include other microphones on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 138 structured on a bottom surface of the body 102. The speaker 138 outputs or presents audio, such as by playing back recorded audio or emitting sounds associated with notifications. The image capture apparatus 100 may include multiple speakers structured on respective surfaces of the body 102.

As shown in FIG. 1B, the image capture apparatus 100 includes the interconnect mechanism 140 structured on a bottom surface of the body 102. The interconnect mechanism 140 removably connects the image capture apparatus 100 to an external structure, such as a handle grip, another mount, or a securing device. The interconnect mechanism 140 includes folding protrusions configured to move between a nested or collapsed position as shown in FIG. 1B and an extended or open position. The folding protrusions of the interconnect mechanism 140 in the extended or open position may be coupled to reciprocal protrusions of other devices such as handle grips, mounts, clips, or like devices. The image capture apparatus 100 may include multiple interconnect mechanisms structured on, or forming a portion of, respective surfaces of the body 102. In some implementations, the interconnect mechanism 140 may be omitted.

As shown in FIG. 1B, the image capture apparatus 100 includes the display 142 structured on, and forming a portion of, a rear surface of the body 102. The display 142 outputs, such as presents or displays, such as by emitting visible light, data, such as to show image information such as image previews, live video capture, or status information such as battery life, camera mode, elapsed time, and the like. In some implementations, the display 142 may be an interactive display, which may receive, detect, or capture input, such as user input representing user interaction with the image capture apparatus 100. The image capture apparatus 100 may include multiple displays structured on respective surfaces of the body 102, such as the displays 108, 142 shown in FIGS. 1A-1B. In some implementations, the display 142 may be omitted or combined with another component of the image capture apparatus 100.

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100. For example, the image capture apparatus 100 may communicate with an external device, such as an external user interface device, via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link.

The external device may store, process, display, or combination thereof, the images. The external user interface device may be a computing device, such as a smartphone, a tablet computer, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
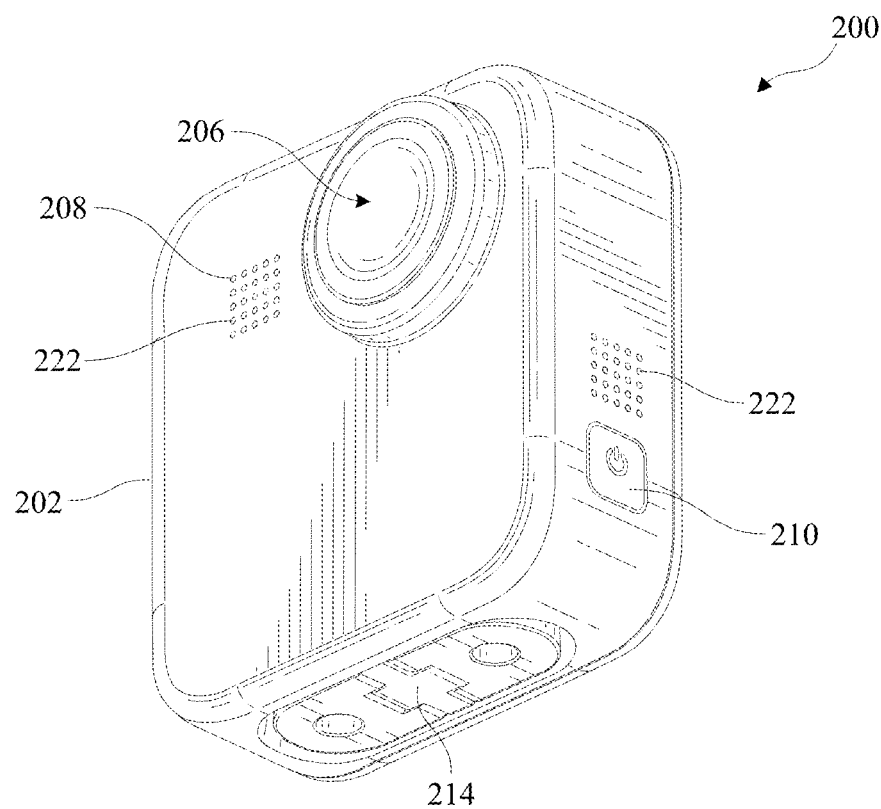
FIGS. 2A-B are isometric views of another example of an image capture apparatus.
Figure 2B:
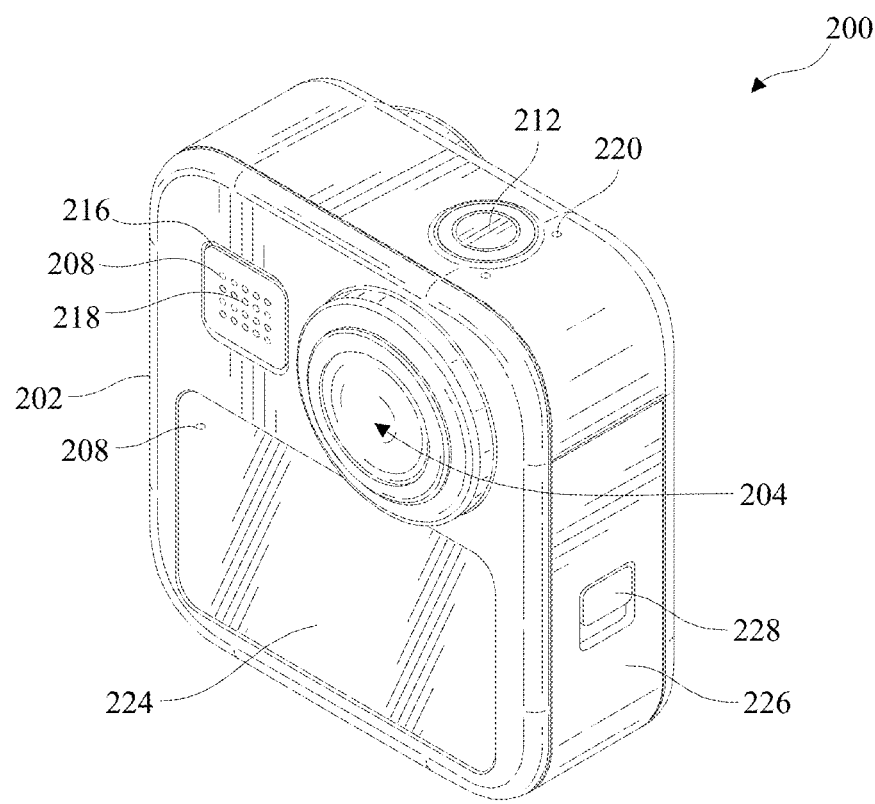

FIGS. 2A-2B illustrate another example of an image capture apparatus 200. The image capture apparatus 200 is similar to the image capture apparatus 100 shown in FIGS. 1A-1B. The image capture apparatus 200 includes a body 202, a first image capture device 204, a second image capture device 206, indicators 208, a mode button 210, a shutter button 212, an interconnect mechanism 214, a drainage channel 216, audio components 218, 220, 222, a display 224, and a door 226 including a release mechanism 228. The arrangement of the components of the image capture apparatus 200 shown in FIGS. 2A-2B is an example, other arrangements of elements may be used.

The body 202 of the image capture apparatus 200 may be similar to the body 102 shown in FIGS. 1A-1B. The first image capture device 204 is structured on a front surface of the body 202. The first image capture device 204 includes a first lens. The first image capture device 204 may be similar to the image capture device 104 shown in FIG. 1A. As shown in FIG. 2A, the image capture apparatus 200 includes the second image capture device 206 structured on a rear surface of the body 202. The second image capture device 206 includes a second lens. The second image capture device 206 may be similar to the image capture device 104 shown in FIG. 1A. The image capture devices 204, 206 are disposed on opposing surfaces of the body 202, for example, in a back-to-back configuration, Janus configuration, or offset Janus configuration. The image capture apparatus 200 may include other image capture devices structured on respective surfaces of the body 202.

As shown in FIG. 2B, the image capture apparatus 200 includes the indicators 208 associated with the audio component 218 and the display 224 on the front surface of the body 202. The indicators 208 may be similar to the indicator 106 shown in FIG. 1A. For example, one of the indicators 208 may indicate a status of the first image capture device 204 and another one of the indicators 208 may indicate a status of the second image capture device 206. Although two indicators 208 are shown in FIGS. 2A-2B, the image capture apparatus 200 may include other indictors structured on respective surfaces of the body 202.

As shown in FIGS. 2A-B, the image capture apparatus 200 includes input mechanisms including the mode button 210, structured on a side surface of the body 202, and the shutter button 212, structured on a top surface of the body 202. The mode button 210 may be similar to the mode button 110 shown in FIG. 1B. The shutter button 212 may be similar to the shutter button 112 shown in FIG. 1A.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 5.

As shown in FIGS. 2A-2B, the image capture apparatus 200 includes the interconnect mechanism 214 structured on a bottom surface of the body 202. The interconnect mechanism 214 may be similar to the interconnect mechanism 140 shown in FIG. 1B.

As shown in FIG. 2B, the image capture apparatus 200 includes the drainage channel 216 for draining liquid from audio components of the image capture apparatus 200.

As shown in FIGS. 2A-2B, the image capture apparatus 200 includes the audio components 218, 220, 222, respectively structured on respective surfaces of the body 202. The audio components 218, 220, 222 may be similar to the microphones 128, 130, 132 and the speaker 138 shown in FIGS. 1A-1B. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts.

As shown in FIGS. 2A-2B, a first audio component 218 is located on a front surface of the body 202, a second audio component 220 is located on a top surface of the body 202, and a third audio component 222 is located on a back surface of the body 202. Other numbers and configurations for the audio components 218, 220, 222 may be used. For example, the audio component 218 may be a drain microphone surrounded by the drainage channel 216 and adjacent to one of the indicators 208 as shown in FIG. 2B.

As shown in FIG. 2B, the image capture apparatus 200 includes the display 224 structured on a front surface of the body 202. The display 224 may be similar to the displays 108, 142 shown in FIGS. 1A-1B. The display 224 may include an I/O interface. The display 224 may include one or more of the indicators 208. The display 224 may receive touch inputs. The display 224 may display image information during video capture. The display 224 may provide status information to a user, such as status information indicating battery power level, memory card capacity, time elapsed for a recorded video, etc. The image capture apparatus 200 may include multiple displays structured on respective surfaces of the body 202. In some implementations, the display 224 may be omitted or combined with another component of the image capture apparatus 200.

As shown in FIG. 2B, the image capture apparatus 200 includes the door 226 structured on, or forming a portion of, the side surface of the body 202. The door 226 may be similar to the door 114 shown in FIG. 1A. For example, the door 226 shown in FIG. 2A includes a release mechanism 228. The release mechanism 228 may include a latch, a button, or other mechanism configured to receive a user input that allows the door 226 to change position. The release mechanism 228 may be used to open the door 226 for a user to access a battery, a battery receptacle, an I/O interface, a memory card interface, etc.

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

Figure 3:
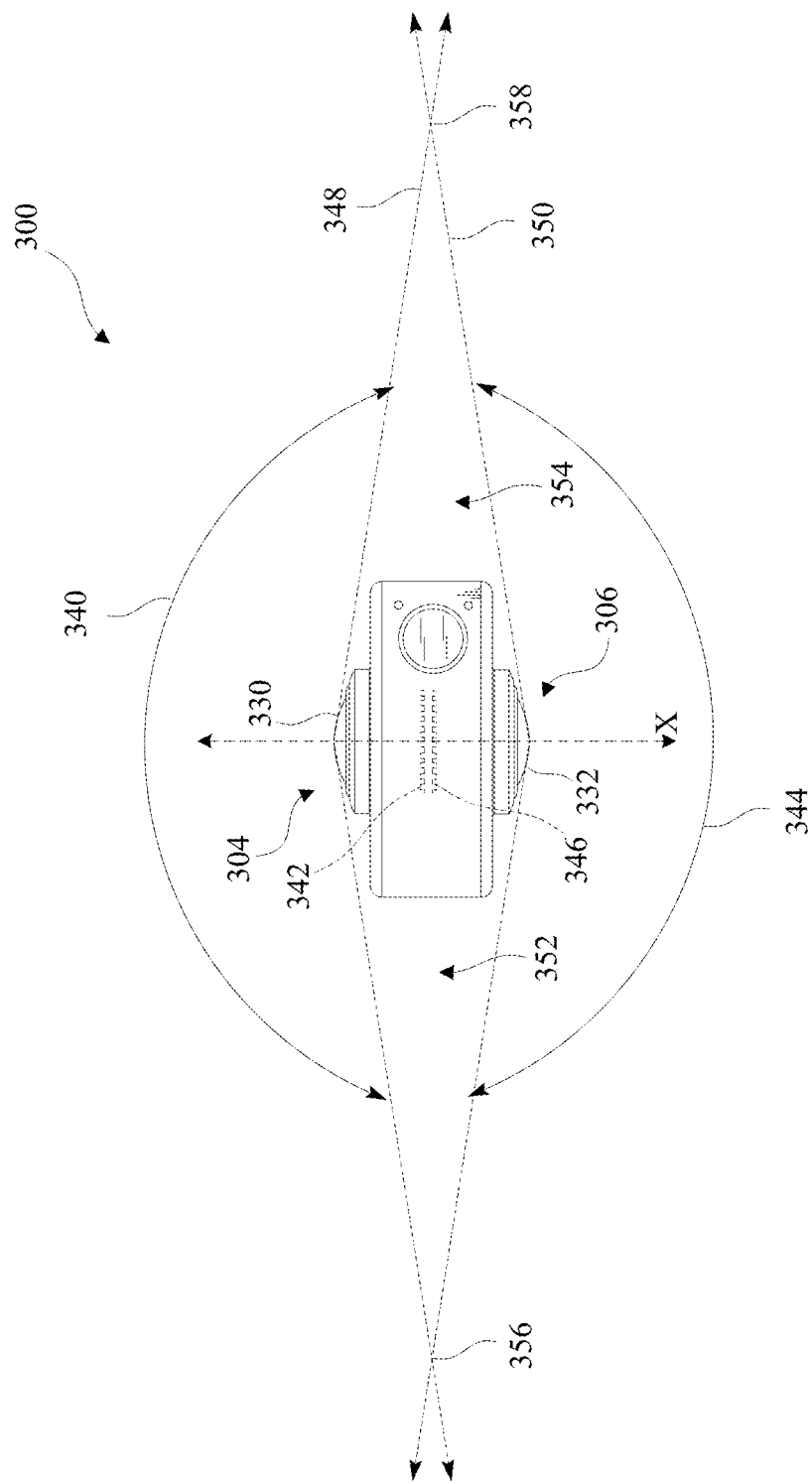
FIG. 3 is a top view of another example of an image capture apparatus.

FIG. 3 is a top view of an image capture apparatus 300. The image capture apparatus 300 is similar to the image capture apparatus 200 of FIGS. 2A-2B and is configured to capture spherical images.

As shown in FIG. 3, a first image capture device 304 includes a first lens 330 and a second image capture device 306 includes a second lens 332. For example, the first image capture device 304 may capture a first image, such as a first hemispheric, or hyper-hemispherical, image, the second image capture device 306 may capture a second image, such as a second hemispheric, or hyper-hemispherical, image, and the image capture apparatus 300 may generate a spherical image incorporating or combining the first image and the second image, which may be captured concurrently, or substantially concurrently.

The first image capture device 304 defines a first field-of-view 340 wherein the first lens 330 of the first image capture device 304 receives light. The first lens 330 directs the received light corresponding to the first field-of-view 340 onto a first image sensor 342 of the first image capture device 304. For example, the first image capture device 304 may include a first lens barrel (not expressly shown), extending from the first lens 330 to the first image sensor 342.

The second image capture device 306 defines a second field-of-view 344 wherein the second lens 332 receives light. The second lens 332 directs the received light corresponding to the second field-of-view 344 onto a second image sensor 346 of the second image capture device 306. For example, the second image capture device 306 may include a second lens barrel (not expressly shown), extending from the second lens 332 to the second image sensor 346.

A boundary 348 of the first field-of-view 340 is shown using broken directional lines. A boundary 350 of the second field-of-view 344 is shown using broken directional lines. As shown, the image capture devices 304, 306 are arranged in a back-to-back (Janus) configuration such that the lenses 330, 332 face in opposite directions, and such that the image capture apparatus 300 may capture spherical images. The first image sensor 342 captures a first hyper-hemispherical image plane from light entering the first lens 330. The second image sensor 346 captures a second hyper-hemispherical image plane from light entering the second lens 332.

As shown in FIG. 3, the fields-of-view 340, 344 partially overlap such that the combination of the fields-of-view 340, 344 forms a spherical field-of-view, except that one or more uncaptured areas 352, 354 may be outside of the fields-of-view 340, 344 of the lenses 330, 332. Light emanating from or passing through the uncaptured areas 352, 354, which may be proximal to the image capture apparatus 300, may be obscured from the lenses 330, 332 and the corresponding image sensors 342, 346, such that content corresponding to the uncaptured areas 352, 354 may be omitted from images captured by the image capture apparatus 300. In some implementations, the image capture devices 304, 306, or the lenses 330, 332 thereof, may be configured to minimize the uncaptured areas 352, 354.

Examples of points of transition, or overlap points, from the uncaptured areas 352, 354 to the overlapping portions of the fields-of-view 340, 344 are shown at 356, 358.

Images contemporaneously captured by the respective image sensors 342, 346 may be combined to form a combined image, such as a spherical image. Generating a combined image may include correlating the overlapping regions captured by the respective image sensors 342, 346, aligning the captured fields-of-view 340, 344, and stitching the images together to form a cohesive combined image. Stitching the images together may include correlating the overlap points 356, 358 with respective locations in corresponding images captured by the image sensors 342, 346. Although a planar view of the fields-of-view 340, 344 is shown in FIG. 3, the fields-of-view 340, 344 are hyper-hemispherical.

A change in the alignment, such as position, tilt, or a combination thereof, of the image capture devices 304, 306, such as of the lenses 330, 332, the image sensors 342, 346, or both, may change the relative positions of the respective fields-of-view 340, 344, may change the locations of the overlap points 356, 358, such as with respect to images captured by the image sensors 342, 346, and may change the uncaptured areas 352, 354, which may include changing the uncaptured areas 352, 354 unequally.

Incomplete or inaccurate information indicating the alignment of the image capture devices 304, 306, such as the locations of the overlap points 356, 358, may decrease the accuracy, efficiency, or both of generating a combined image. In some implementations, the image capture apparatus 300 may maintain information indicating the location and orientation of the image capture devices 304, 306, such as of the lenses 330, 332, the image sensors 342, 346, or both, such that the fields-of-view 340, 344, the overlap points 356, 358, or both may be accurately determined, which may improve the accuracy, efficiency, or both of generating a combined image.

The lenses 330, 332 may be aligned along an axis X as shown, laterally offset from each other (not shown), off-center from a central axis of the image capture apparatus 300 (not shown), or laterally offset and off-center from the central axis (not shown). Whether through use of offset or through use of compact image capture devices 304, 306, a reduction in distance between the lenses 330, 332 along the axis X may improve the overlap in the fields-of-view 340, 344, such as by reducing the uncaptured areas 352, 354.

Images or frames captured by the image capture devices 304, 306 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 356, 358, may be matched accurately to minimize boundary discontinuities.

Figure 4A:
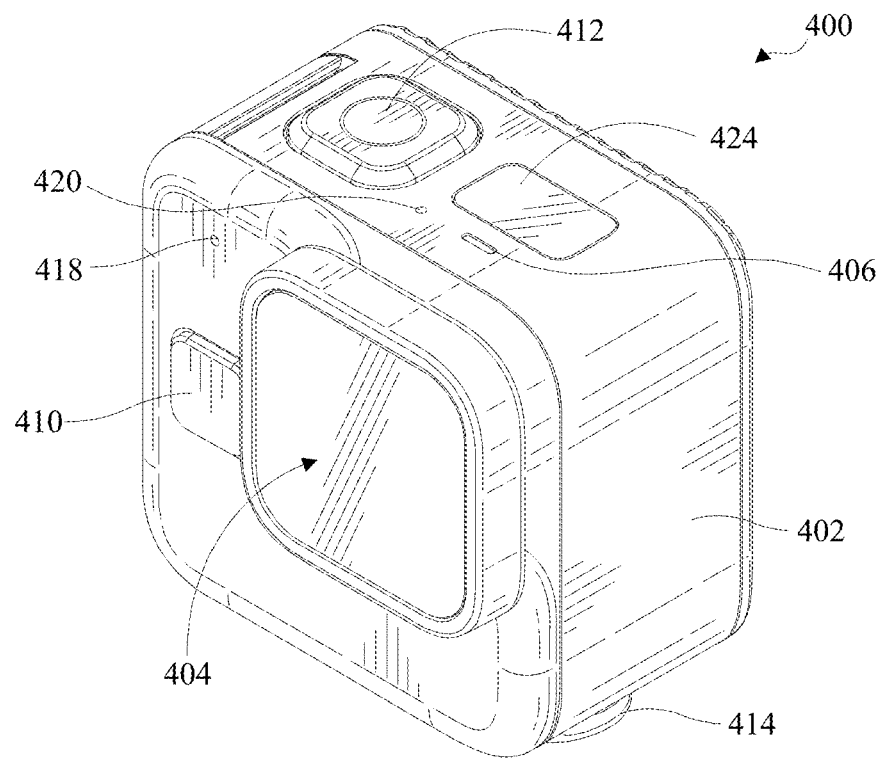
FIGS. 4A-4B are isometric views of another example of an image capture apparatus.
Figure 4B:
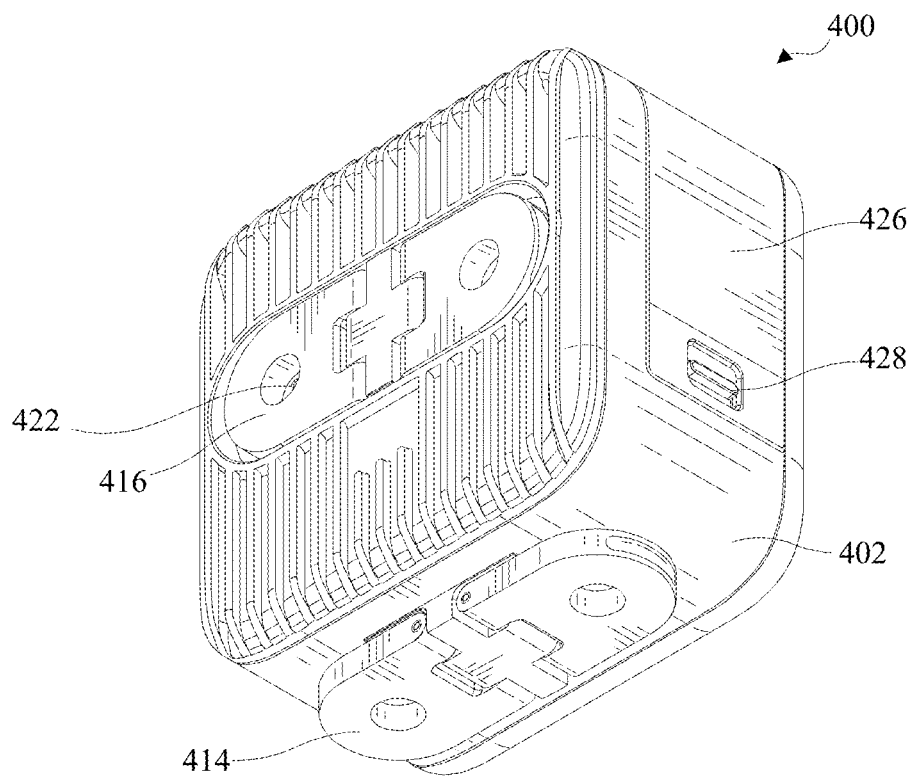

FIGS. 4A-4B illustrate another example of an image capture apparatus 400. The image capture apparatus 400 is similar to the image capture apparatus 100 shown in FIGS. 1A-1B and to the image capture apparatus 200 shown in FIGS. 2A-2B. The image capture apparatus 400 includes a body 402, an image capture device 404, an indicator 406, a mode button 410, a shutter button 412, interconnect mechanisms 414, 416, audio components 418, 420, 422, a display 424, and a door 426 including a release mechanism 428. The arrangement of the components of the image capture apparatus 400 shown in FIGS. 4A-4B is an example, other arrangements of elements may be used.

The body 402 of the image capture apparatus 400 may be similar to the body 102 shown in FIGS. 1A-1B. The image capture device 404 is structured on a front surface of the body 402. The image capture device 404 includes a lens and may be similar to the image capture device 104 shown in FIG. 1A.

As shown in FIG. 4A, the image capture apparatus 400 includes the indicator 406 on a top surface of the body 402. The indicator 406 may be similar to the indicator 106 shown in FIG. 1A. The indicator 406 may indicate a status of the image capture device 204. Although one indicator 406 is shown in FIGS. 4A, the image capture apparatus 400 may include other indictors structured on respective surfaces of the body 402.

As shown in FIGS. 4A, the image capture apparatus 400 includes input mechanisms including the mode button 410, structured on a front surface of the body 402, and the shutter button 412, structured on a top surface of the body 402. The mode button 410 may be similar to the mode button 110 shown in FIG. 1B. The shutter button 412 may be similar to the shutter button 112 shown in FIG. 1A.

The image capture apparatus 400 includes internal electronics (not expressly shown), such as imaging electronics, power electronics, and the like, internal to the body 402 for capturing images and performing other functions of the image capture apparatus 400. An example showing internal electronics is shown in FIG. 5.

As shown in FIGS. 4A-4B, the image capture apparatus 400 includes the interconnect mechanisms 414, 416, with a first interconnect mechanism 414 structured on a bottom surface of the body 402 and a second interconnect mechanism 416 disposed within a rear surface of the body 402. The interconnect mechanisms 414, 416 may be similar to the interconnect mechanism 140 shown in FIG. 1B and the interconnect mechanism 214 shown in FIG. 2A.

As shown in FIGS. 4A-4B, the image capture apparatus 400 includes the audio components 418, 420, 422 respectively structured on respective surfaces of the body 402. The audio components 418, 420, 422 may be similar to the microphones 128, 130, 132 and the speaker 138 shown in FIGS. 1A-1B. One or more of the audio components 418, 420, 422 may be, or may include, audio sensors, such as microphones, to receive and record audio signals, such as voice commands or other audio, in conjunction with capturing images or video. One or more of the audio components 418, 420, 422 may be, or may include, an audio presentation component that may present, or play, audio, such as to provide notifications or alerts.

As shown in FIGS. 4A-4B, a first audio component 418 is located on a front surface of the body 402, a second audio component 420 is located on a top surface of the body 402, and a third audio component 422 is located on a rear surface of the body 402. Other numbers and configurations for the audio components 418, 420, 422 may be used.

As shown in FIG. 4A, the image capture apparatus 400 includes the display 424 structured on a front surface of the body 402. The display 424 may be similar to the displays 108, 142 shown in FIGS. 1A-1B. The display 424 may include an I/O interface. The display 424 may receive touch inputs. The display 424 may display image information during video capture. The display 424 may provide status information to a user, such as status information indicating battery power level, memory card capacity, time elapsed for a recorded video, etc. The image capture apparatus 400 may include multiple displays structured on respective surfaces of the body 402. In some implementations, the display 424 may be omitted or combined with another component of the image capture apparatus 200.

As shown in FIG. 4B, the image capture apparatus 400 includes the door 426 structured on, or forming a portion of, the side surface of the body 402. The door 426 may be similar to the door 226 shown in FIG. 2B. The door 426 shown in FIG. 4B includes the release mechanism 428. The release mechanism 428 may include a latch, a button, or other mechanism configured to receive a user input that allows the door 426 to change position. The release mechanism 428 may be used to open the door 426 for a user to access a battery, a battery receptacle, an I/O interface, a memory card interface, etc.

In some embodiments, the image capture apparatus 400 may include features or components other than those described herein, some features or components described herein may be omitted, or some features or components described herein may be combined. For example, the image capture apparatus 400 may include additional interfaces or different interface features, interchangeable lenses, cold shoes, or hot shoes.

FIG. 5 is a block diagram of electronic components in an image capture apparatus 500. The image capture apparatus 500 may be a single-lens image capture device, a multi-lens image capture device, or variations thereof, including an image capture apparatus with multiple capabilities such as the use of interchangeable integrated sensor lens assemblies. Components, such as electronic components, of the image capture apparatus 100 shown in FIGS. 1A-B, the image capture apparatus 200 shown in FIGS. 2A-B, the image capture apparatus 300 shown in FIG. 3, or the image capture apparatus 400 shown in FIGS. 4A-4B, may be implemented as shown in FIG. 5.

The image capture apparatus 500 includes a body 502. The body 502 may be similar to the body 102 shown in FIGS. 1A-1B, the body 202 shown in FIGS. 2A-2B, or the body 402 shown in FIGS. 4A-4B. The body 502 includes electronic components such as capture components 510, processing components 520, data interface components 530, spatial sensors 540, power components 550, user interface components 560, and a bus 580.

The capture components 510 include an image sensor 512 for capturing images. Although one image sensor 512 is shown in FIG. 5, the capture components 510 may include multiple image sensors. The image sensor 512 may be similar to the image sensors 342, 346 shown in FIG. 3. The image sensor 512 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 512 detects light, such as within a defined spectrum, such as the visible light spectrum or the infrared spectrum, incident through a corresponding lens such as the first lens 330 with respect to the first image sensor 342 or the second lens 332 with respect to the second image sensor 346 as shown in FIG. 3. The image sensor 512 captures detected light as image data and conveys the captured image data as electrical signals (image signals or image data) to the other components of the image capture apparatus 500, such as to the processing components 520, such as via the bus 580.

The capture components 510 include a microphone 514 for capturing audio. Although one microphone 514 is shown in FIG. 5, the capture components 510 may include multiple microphones. The microphone 514 detects and captures, or records, sound, such as sound waves incident upon the microphone 514. The microphone 514 may detect, capture, or record sound in conjunction with capturing images by the image sensor 512. The microphone 514 may detect sound to receive audible commands to control the image capture apparatus 500. The microphone 514 may be similar to the microphones 128, 130, 132 shown in FIGS. 1A-1B, the audio components 218, 220, 222 shown in FIGS. 2A-2B, or the audio components 418, 420, 422 shown in FIGS. 4A-4B.

The processing components 520 perform image signal processing, such as filtering, tone mapping, or stitching, to generate, or obtain, processed images, or processed image data, based on image data obtained from the image sensor 512. The processing components 520 may include one or more processors having single or multiple processing cores. In some implementations, the processing components 520 may include, or may be, an application specific integrated circuit (ASIC) or a digital signal processor (DSP). For example, the processing components 520 may include a custom image signal processor. The processing components 520 conveys data, such as processed image data, with other components of the image capture apparatus 500 via the bus 580. In some implementations, the processing components 520 may include an encoder, such as an image or video encoder that may encode, decode, or both, the image data, such as for compression coding, transcoding, or a combination thereof.

Although not shown expressly in FIG. 5, the processing components 520 may include memory, such as a random-access memory (RAM) device, which may be non-transitory computer-readable memory. The memory of the processing components 520 may include executable instructions and data that can be accessed by the processing components 520.

The data interface components 530 communicates with other, such as external, electronic devices, such as a remote control, a smartphone, a tablet computer, a laptop computer, a desktop computer, or an external computer storage device. For example, the data interface components 530 may receive commands to operate the image capture apparatus 500. In another example, the data interface components 530 may transmit image data to transfer the image data to other electronic devices. The data interface components 530 may be configured for wired communication, wireless communication, or both. As shown, the data interface components 530 include an I/O interface 532, a wireless data interface 534, and a storage interface 536. In some implementations, one or more of the I/O interface 532, the wireless data interface 534, or the storage interface 536 may be omitted or combined.

The I/O interface 532 may send, receive, or both, wired electronic communications signals. For example, the I/O interface 532 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 532 is shown in FIG. 5, the data interface components 530 include multiple I/O interfaces. The I/O interface 532 may be similar to the data interface 124 shown in FIG. 1B.

The wireless data interface 534 may send, receive, or both, wireless electronic communications signals. The wireless data interface 534 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 534 is shown in FIG. 5, the data interface components 530 include multiple wireless data interfaces. The wireless data interface 534 may be similar to the data interface 124 shown in FIG. 1B.

The storage interface 536 may include a memory card connector, such as a memory card receptacle, configured to receive and operatively couple to a removable storage device, such as a memory card, and to transfer, such as read, write, or both, data between the image capture apparatus 500 and the memory card, such as for storing images, recorded audio, or both captured by the image capture apparatus 500 on the memory card. Although one storage interface 536 is shown in FIG. 5, the data interface components 530 include multiple storage interfaces. The storage interface 536 may be similar to the data interface 124 shown in FIG. 1B.

The spatial, or spatiotemporal, sensors 540 detect the spatial position, movement, or both, of the image capture apparatus 500. As shown in FIG. 5, the spatial sensors 540 include a position sensor 542, an accelerometer 544, and a gyroscope 546. The position sensor 542, which may be a global positioning system (GPS) sensor, may determine a geospatial position of the image capture apparatus 500, which may include obtaining, such as by receiving, temporal data, such as via a GPS signal. The accelerometer 544, which may be a three-axis accelerometer, may measure linear motion, linear acceleration, or both of the image capture apparatus 500. The gyroscope 546, which may be a three-axis gyroscope, may measure rotational motion, such as a rate of rotation, of the image capture apparatus 500. In some implementations, the spatial sensors 540 may include other types of spatial sensors. In some implementations, one or more of the position sensor 542, the accelerometer 544, and the gyroscope 546 may be omitted or combined.

The power components 550 distribute electrical power to the components of the image capture apparatus 500 for operating the image capture apparatus 500. As shown in FIG. 5, the power components 550 include a battery interface 552, a battery 554, and an external power interface 556 (ext. interface). The battery interface 552 (bat. interface) operatively couples to the battery 554, such as via conductive contacts to transfer power from the battery 554 to the other electronic components of the image capture apparatus 500. The battery interface 552 may be similar to the battery receptacle 126 shown in FIG. 1B. The external power interface 556 obtains or receives power from an external source, such as a wall plug or external battery, and distributes the power to the components of the image capture apparatus 500, which may include distributing power to the battery 554 via the battery interface 552 to charge the battery 554. Although one battery interface 552, one battery 554, and one external power interface 556 are shown in FIG. 5, any number of battery interfaces, batteries, and external power interfaces may be used. In some implementations, one or more of the battery interface 552, the battery 554, and the external power interface 556 may be omitted or combined. For example, in some implementations, the external interface 556 and the I/O interface 532 may be combined.

The user interface components 560 receive input, such as user input, from a user of the image capture apparatus 500, output, such as display or present, information to a user, or both receive input and output information, such as in accordance with user interaction with the image capture apparatus 500.

As shown in FIG. 5, the user interface components 560 include visual output components 562 to visually communicate information, such as to present captured images. As shown, the visual output components 562 include an indicator 564 and a display 566. The indicator 564 may be similar to the indicator 106 shown in FIG. 1A, the indicators 208 shown in FIGS. 2A-2B, or the indicator 406 shown in FIG. 4A. The display 566 may be similar to the display 108 shown in FIG. 1A, the display 142 shown in FIG. 1B, the display 224 shown in FIG. 2B, or the display 424 shown in FIG. 4A. Although the visual output components 562 are shown in FIG. 5 as including one indicator 564, the visual output components 562 may include multiple indicators. Although the visual output components 562 are shown in FIG. 5 as including one display 566, the visual output components 562 may include multiple displays. In some implementations, one or more of the indicator 564 or the display 566 may be omitted or combined.

As shown in FIG. 5, the user interface components 560 include a speaker 568. The speaker 568 may be similar to the speaker 138 shown in FIG. 1B, the audio components 218, 220, 222 shown in FIGS. 2A-2B, or the audio components 418, 420, 422 shown in FIGS. 4A-4B. Although one speaker 568 is shown in FIG. 5, the user interface components 560 may include multiple speakers. In some implementations, the speaker 568 may be omitted or combined with another component of the image capture apparatus 500, such as the microphone 514.

As shown in FIG. 5, the user interface components 560 include a physical input interface 570. The physical input interface 570 may be similar to the mode buttons 110, 210, 410 shown in FIGS. 1A, 2A, and 4A or the shutter buttons 112, 212, 412 shown in FIGS. 1A, 2B, and 4A. Although one physical input interface 570 is shown in FIG. 5, the user interface components 560 may include multiple physical input interfaces. In some implementations, the physical input interface 570 may be omitted or combined with another component of the image capture apparatus 500. The physical input interface 570 may be, for example, a button, a toggle, a switch, a dial, or a slider.

As shown in FIG. 5, the user interface components 560 include a broken line border box labeled "other" to indicate that components of the image capture apparatus 500 other than the components expressly shown as included in the user interface components 560 may be user interface components. For example, the microphone 514 may receive, or capture, and process audio signals to obtain input data, such as user input data corresponding to voice commands. In another example, the image sensor 512 may receive, or capture, and process image data to obtain input data, such as user input data corresponding to visible gesture commands. In another example, one or more of the spatial sensors 540, such as a combination of the accelerometer 544 and the gyroscope 546, may receive, or capture, and process motion data to obtain input data, such as user input data corresponding to motion gesture commands.

Figure 6:
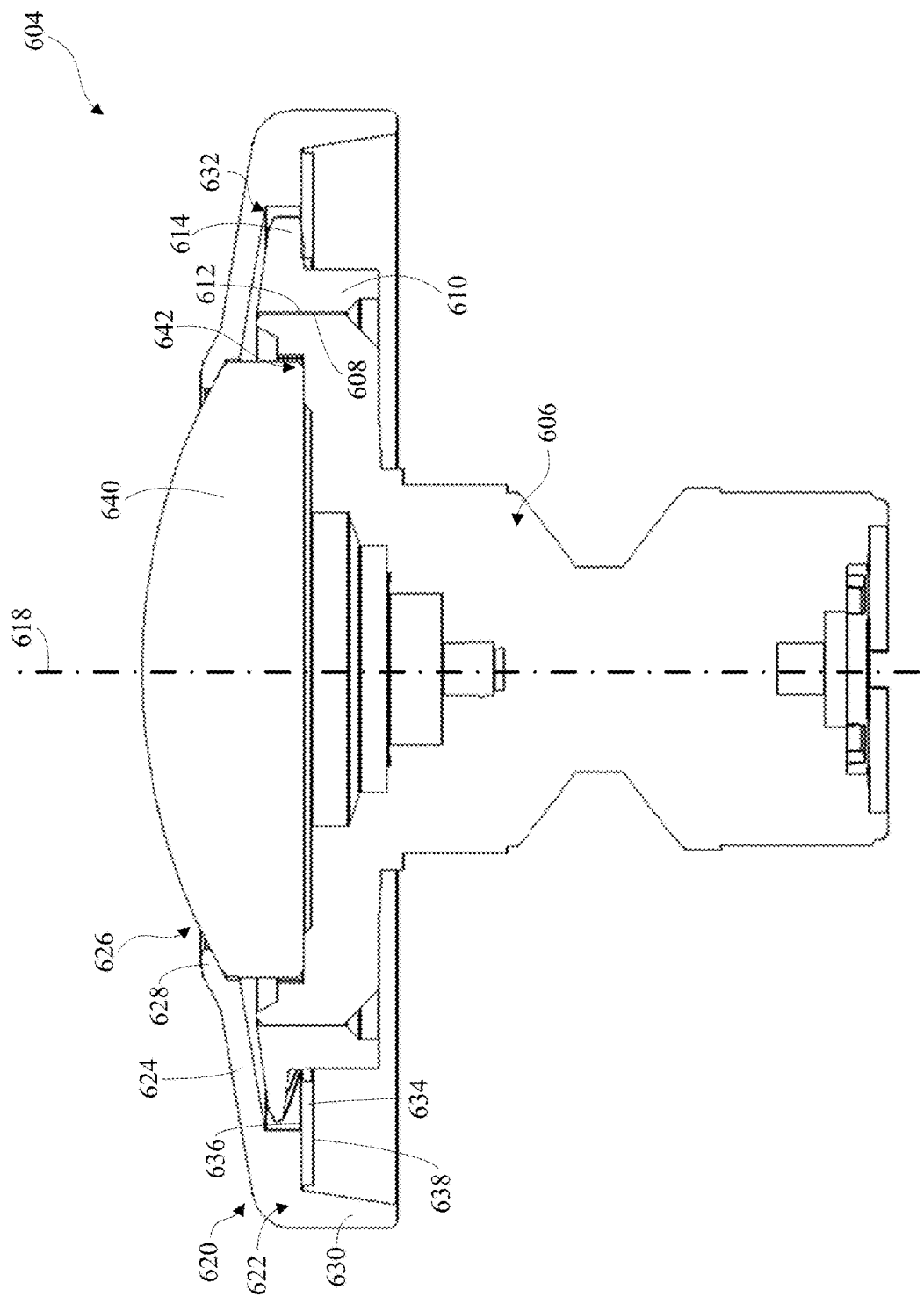
FIG. 6 is a partial cross-sectional view of an image capture device that includes a replaceable lens module.

FIG. 6 is a partial cross-sectional view of an image capture device 604. The image capture device 604 may be similar to the image capture devices 104, 204, 206, 304, 306, 404 described above. A body and other portions of the image capture device 604 have been removed from the partial cross-sectional view for clarity and simplicity.

The image capture device 604 may include a lens barrel 606. The lens barrel 606 may be disposed in a body of the image capture device 604 and may include an engaging surface 608 along an exterior surface of the lens barrel 606. The lens barrel 606 may be at least partially protected by the body of the image capture device 604 from damage and/or impact. A bayonet 610 having one or more fingers 614 may be coupled to the lens barrel 606. The bayonet 610 may be coupled to the lens barrel 606 in any desired manner, such as with one or more fasteners, adhesives, mechanical interlocks, or a combination thereof. For example, as shown in FIG. 6, the bayonet 610 may include a mounting surface 612 that is coupled to an engaging surface 608 of the lens barrel 606. The mounting surface 612 of the bayonet 610 and the engaging surface 608 of the lens barrel 606 may be coupled to one another to maintain an axial and/or rotational position of the bayonet 610 with respect to an optical axis 618 of the lens barrel 606. For example, the bayonet 610 may be press-fit onto the lens barrel 606 or may form a friction fit with the lens barrel 606 to prevent the bayonet 610 from rotating about the optical axis 618 and/or moving axially along or parallel to the optical axis 618. Therefore, a position of the bayonet 610 with respect to the lens barrel 606 may be maintained. Additionally, as shown in FIG. 6, the lens barrel 606 and the bayonet 610 may be substantially coaxial along the optical axis 618. In other configurations, an axis of the bayonet 610 may be substantially parallel or nonparallel to the optical axis 618 of the lens barrel 606.

The fingers 614 of the bayonet 610 may project outward from the bayonet 610 and away from the optical axis 618 of the lens barrel 606. The fingers 614 may be configured to engage a replaceable lens module 620 of the image capture device 604. The fingers 614 of the bayonet 610 may include male portions that are configured to engage female portions of the replaceable lens module 620 to couple the replaceable lens module 620 to the lens barrel 606. The fingers 614 of the bayonet 610 may not be limited to any particular size and/or shape. In certain configurations, the fingers 614 may extend substantially orthogonal to the optical axis 618 and away from the lens barrel 606. Additionally, any number of fingers 614 may be located on the bayonet 610. For example, the bayonet 610 may extend annularly around a localized circumference of the lens barrel 606, and the fingers 614 may be positioned uniformly and annularly around the bayonet 610. In certain configurations, the fingers 614 may be positioned in a nonuniform manner around the bayonet 610, such as where the fingers 614 may be particularly clocked to engage specific points along the replaceable lens module 620.

As discussed above, the bayonet 610 may be configured to engage the replaceable lens module 620. The replaceable lens module 620 may be configured to removably couple to the bayonet 610. Advantageously, the replaceable lens module 620 may be easily disconnected or removed from the image capture device 604 by disengaging the replaceable lens module 620 from the bayonet 610 (e.g., by disconnecting the replaceable lens module 620 from the fingers 614 of the bayonet 610. As a result, the replaceable lens module 620 may be replaced or swapped out for another or different replaceable lens module 620 if desired without impacting the lens barrel 606 of the image capture device 604.

The replaceable lens module 620 may include a retaining ring 622. The retaining ring 622 may include a radial portion 624 having a retaining flange 628, an opening 626 disposed in the radial portion 624, and an axial portion 630 connected to the radial portion 624. A channel 632 may be formed between the retaining ring 622 and a spring plate 634 coupled to the retaining ring 622. The spring plate 634 may include a forward surface 636 and an opposing rearward surface 638. Additionally, a lens may be positioned in the opening 626 of the retaining ring 622. The lens may be an external lens 640 positioned outwardly with respect to the internal lens(es) located within the lens barrel 606. As a result, the external lens 640 may be at least partially exposed along an exterior of the image capture device 604.

As discussed above, the retaining ring 622 may include an axial portion 630. The axial portion 630 may extend substantially parallel to the optical axis 618 of the lens barrel 606. The axial portion 630 may also extend in a nonparallel direction with respect to the optical axis 618. For example, the axial portion 630 may be tapered such that the axial portion 630 extends both downward in a direction substantially parallel to the optical axis 618 and outward with respect to the optical axis 618 in a nonparallel direction.

The radial portion 624 of the retaining ring 622 may extend inward towards the optical axis 618 of the lens barrel 606. The opening 626 of the retaining ring 622 may be disposed in the radial portion 624. Additionally, the radial portion 624 may be connected to, or formed with, the axial portion 630 of the retaining ring 622. As such, the radial portion 624 may extend inward from the axial portion 630 and towards the optical axis 618 to engage the external lens 640.

As shown in FIG. 6, the radial portion 624 of the bayonet may include a retaining flange 628 that at least partially surrounds the opening 626 of the retaining ring 622. The retaining flange 628 may be configured to contact the external lens 640 and position the external lens 640 with respect to the lens barrel 606. For example, the retaining flange 628 may be a localized decrease in thickness of the radial portion 624 of the retaining ring 622 to form a groove or notch between the radial portion 624 and an interior surface of the retaining flange 628. The external lens 640 may then be positioned in the groove or the notch formed between the radial portion 624 and the interior surface of the retaining flange 628, thereby preventing lateral movement of the external lens 640 with respect to the optical axis 618 when the replaceable lens module 620 is coupled to the bayonet 610. Additionally, as shown in FIG. 6, the retaining flange 628 may extend inward toward the optical axis 618 so that the retaining flange 628 is positioned over an exterior surface of the external lens 640. As a result, the retaining flange 628 may also prevent axial movement of the external lens 640 along the optical axis 618 with respect to the lens barrel 606.

The replaceable lens module 620 may be movable along and about the optical axis 618 of the lens barrel 606 to couple the replaceable lens module 620 to the bayonet 610. The replaceable lens module 620 may be moved toward the lens barrel 606 along the optical axis 618 so that the external lens 640 contacts the lens barrel 606. As shown in FIG. 6, the bayonet 610 may include a lens recess 642 that may be configured to receive the external lens 640 of the replaceable lens module 620. As such, the external lens 640 may be positioned in the lens recess 642 of the bayonet 610 when the replaceable lens module 620 is coupled to the bayonet 610. The lens recess 642 may be a channel, groove, cutout, or other shape formed along an outer portion of the lens barrel 606 that is located adjacent to the replaceable lens module 620 (e.g., the outer portion of the lens barrel 606 may be located near an exterior surface of the image capture device 604). Additionally, the lens recess 642 may be configured to maintain a position of the external lens 640 in conjunction with the retaining flange 628 of the retaining ring 622 when the retaining ring 622 is engaged to the bayonet 610.

To facilitate engagement between the retaining ring 622 and the bayonet 610, the replaceable lens module 620 may include a spring plate 634 coupled to an interior surface of the retaining ring 622. The spring plate 634 may be configured to engage the fingers 614 of the bayonet 610 to releasably couple the replaceable lens module 620 to the bayonet 610. The spring plate 634 may extend radially inward from the retaining ring 622 towards the optical axis 618 of the lens barrel 606 to engage the fingers 614 of the bayonet 610. Advantageously, the spring plate 634 may be configured to elastically deform when the spring plate 634 engages the fingers 614 of the bayonet 610 to compress the replaceable lens module 620 towards the lens barrel 606. For example, the spring plate 634 may be configured to engage the bayonet 610 (e.g., the fingers 614 of the bayonet 610) and elastically deform to create a friction fit between the bayonet 610 and the spring plate 634.

As stated above, the spring plate 634 may be coupled to an interior surface of the retaining ring 622. More particularly, the spring plate 634 may include a forward surface 636 and an opposing rearward surface 638, and the forward surface 636 of the spring plate 634 may be coupled to an interior surface of the retaining ring 622 (e.g., an interior surface of the axial portion 630, an interior surface of the radial portion 624, or both). The forward surface 636 of the spring plate 634 may be located forward of the rearward surface 638 along the optical axis 618 in a direction from the lens barrel 606 toward the external lens 640. That is, the forward surface 636 may be located closer to an exterior surface of the image capture device 604 (e.g., an exterior surface of the external lens 640) than the rearward surface 638. Additionally, the forward surface 636 may be configured to contact the fingers 614 of the bayonet 610 to couple the replaceable lens module 620 to the bayonet 610. As discussed in further detail below, the spring plate 634 and the retaining ring 622 may form a channel 632 or receptacle, and the fingers 614 of the bayonet 610 may be positioned in the channel 632 so that the fingers 614 engage the forward surface 636 of the spring plate 634.

As shown in FIG. 6, the spring plate 634 may extend inwardly to engage the bayonet 610, whereby the bayonet 610 in disposed inward of the retaining ring 622 with respect to the optical axis 618 of the image capture device 604. In certain configurations, the bayonet 610 may be positioned outward of the retaining ring 622 with respect to the optical axis 618 of the image capture device 604. As a result, the spring plate 634 may be coupled to an outer surface of the retaining ring 622, such as an outer surface of the axial portion 630 of the retaining ring 622. The spring plate 634 may extend outward from the outer surface of the retaining ring 622 away from the optical axis 618 to engage the bayonet 610 (e.g., engage the fingers 614 of the bayonet 610). Therefore, the spring plate 634 as described above may not be limited to engagement with the bayonet 610 positioned inward of the retaining ring 622 and may be coupled to the retaining ring 622 in a manner that facilitates engagement between the retaining ring 622 and a bayonet positioned outward of the retaining ring 622.

Figure 7A:
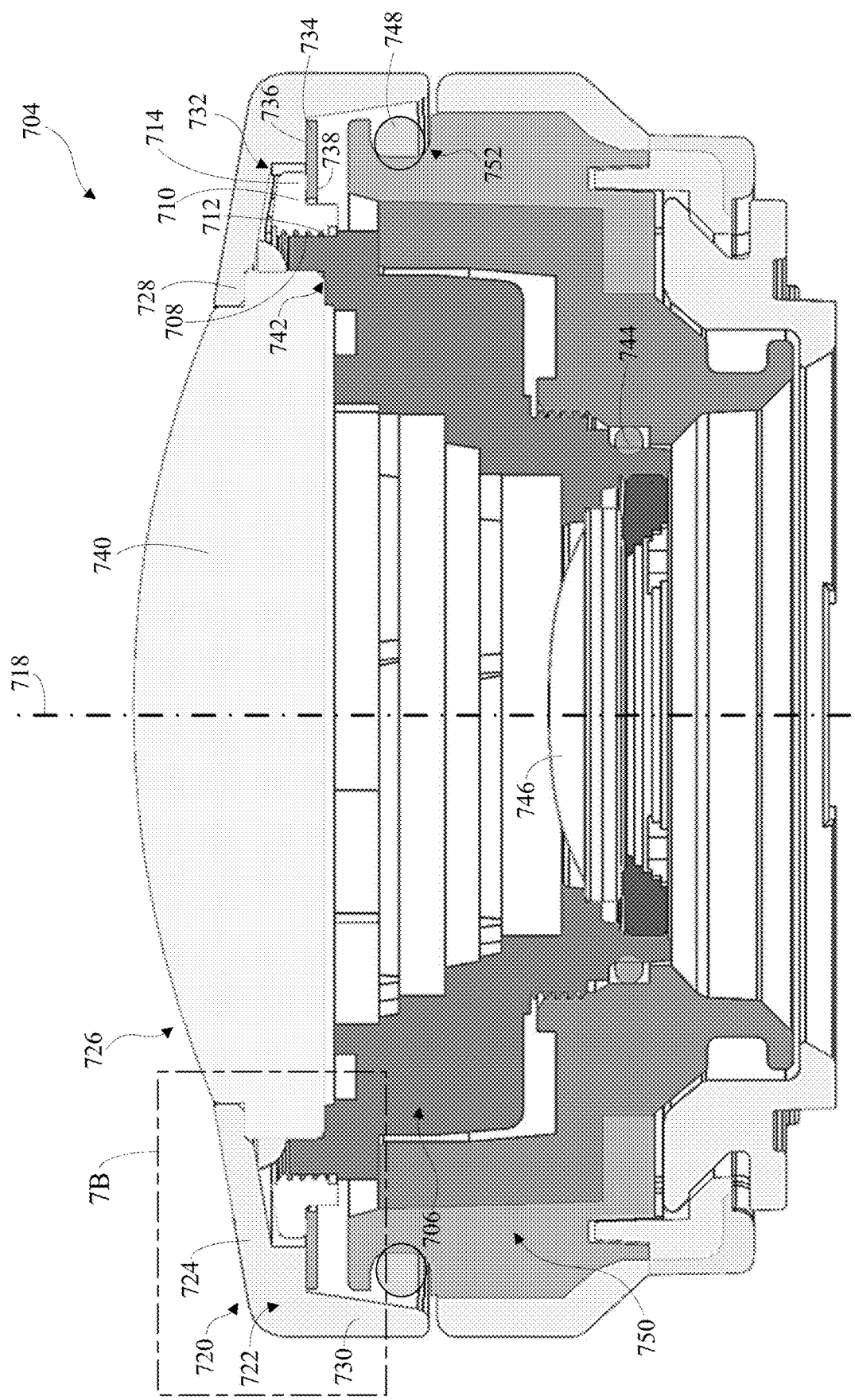
FIG. 7A is a partial cross-sectional view of another example of an image capture device that includes a replaceable lens module.

FIG. 7A is a partial cross-sectional view of an image capture device 704. The image capture device 704 may be similar to the image capture devices 104, 204, 206, 304, 306, 404, 604 described above. Additionally, it should be noted that portions of the image capture device 704 have been omitted from FIG. 7A for illustrative purposes.

The image capture device 704 may include a lens barrel 706 having an engaging surface 708. The engaging surface 708 may be coupled to a bayonet 710 along a mounting surface 712 of the bayonet 710. Additionally, the bayonet 710 may include one or more fingers 714 that extend radially outward from an optical axis 718 of the lens barrel 706, whereby the fingers 714 may be configured to couple to a replaceable lens module 720. The replaceable lens module may include a retaining ring 722 having a radial portion 724, an opening 726 located in the radial portion 724 and at least partially surrounded by a retaining flange 728, and an axial portion 730 connected to the radial portion 724. A channel 732 may be formed between the retaining ring 722 and a spring plate 734 of the replaceable lens module 720, whereby the spring plate 734 may include a forward surface 736 and an opposing rearward surface 738. The channel 732 may receive the fingers 714 of the bayonet 710 to releasably couple an external lens 740 in a lens recess 742 of the bayonet 710.

The lens barrel 706 may be similar to the lens barrel 606 described above. The lens barrel 706 may include a lens barrel seal 744 disposed on an exterior of the lens barrel 606 and one or more internal lenses 746 disposed in the lens barrel 706. The lens barrel seal 744 may be the same or similar to a replaceable lens module seal 748 disposed between the replaceable lens module 720 and a body 750 of the image capture device 704.

The internal lens(es) 746 may be axially aligned within the lens barrel 706 to facilitate the capture of clear and complete images or videos through the lens barrel 706. Additionally, the lens barrel 706 may be disposed in the body 750 of the image capture device 704. The body 750 may be the same or similar to the bodies 102, 202, 402 described above. The body 750 may have any geometry to accommodate a particular lens barrel, such as the lens barrel 706 shown in FIG. 7A.

The lens barrel 706 may be disposed within a cavity or void of the body 750. The lens barrel 706 may be coupled to the body 750. The lens barrel 706 may be threaded into a channel or opening within the body 750 to maintain a position of the lens barrel 706 with respect to the body 750. For example, external threading along the lens barrel 706 may be threaded into internal threading within the channel or the opening of the body 750. The lens barrel 706 may also be coupled to the body 750 in other manners, such as using fasteners, mechanical interlocks, adhesives, welding, heat-staking, or a combination thereof. Additionally, to create a waterproof seal between the lens barrel 706 and the body 750, the lens barrel seal 744 may be disposed between the lens barrel 706 and the body 750. The lens barrel seal 744 may be compressible to engage the lens barrel 706 and/or the body 750. Moreover, the lens barrel seal 744 may be disposed annularly around a circumference of the lens barrel 706.

The bayonet 710 may be coupled to the lens barrel 706. The bayonet 710 may be similar to the bayonet 610 described above. By way or example, the fingers 714 of the bayonet 710 may be similar to the fingers 614 of the bayonet 610. The fingers 714 may extend radially outward from the optical axis 718 of the lens barrel 706 away from the lens barrel 706. The fingers 714 may extend in a nonparallel direction with respect to the optical axis 718 (e.g., the fingers 714 may extend substantially orthogonal to the optical axis 718).

The bayonet 710 may be coupled to the lens barrel 706 in any desired manner. As mentioned above, the bayonet 710 may include the mounting surface 712, and the mounting surface 712 may be configured to couple with the engaging surface 708 of the lens barrel 706. The mounting surface 712 of the bayonet 710 may be threaded onto the engaging surface 708 of the lens barrel 706. The mounting surface 712 may be press-fit onto the engaging surface 708 free of threading. In certain configurations, the mounting surface 712 of the bayonet 710 or the engaging surface 708 may include ribs, contour, a friction modifier (e.g., an abrasive surface), or a combination thereof to facilitate engagement between the bayonet 710 and the lens barrel 706.

As discussed above, the image capture device 704 may include the replaceable lens module 720. The replaceable lens module 720 may be similar to the replaceable lens module 620. The replaceable lens module 720 may include the retaining ring 722, and the external lens 740 may be positioned in the opening 726 of the retaining ring 722. The retaining ring 722 may be configured to removably couple the replaceable lens module 720 to the bayonet 710 of the image capture device 704. For example, the fingers 714 of the bayonet 710 may project radially with respect to the optical axis 718 of the lens barrel, and the retaining ring 722 or a portion thereof may be configured to engage the fingers 714 of the bayonet 710 to secure the replaceable lens module 720 to the bayonet 710.

Advantageously, due to the engagement between the replaceable lens module 720 and the bayonet 710, the replaceable lens module 720 may be configured to axially align the external lens 740 of the replaceable lens module 720 and the lens barrel 706 of the image capture device 704 (e.g., axially align the external lens 740 and the lens barrel 706 along the optical axis 718). More specifically, the replaceable lens disposed in the retaining ring 722 (e.g., the external lens 740) may be configured to be aligned to the optical axis 718 of the lens barrel 706 using the retaining ring 722 of the replaceable lens module 720. As a result, the external lens 740 and the internal lens(es) 746 located within the lens barrel 706 may be axially aligned about the optical axis 718, thereby ensuring images or videos captured by the image capture device 704 through the external lens 740 and the internal lens(es) 746 are clear and remain undistorted, even if the replaceable lens module 720 is replaced or changed.

As discussed above, the retaining ring 722 of the replaceable lens module 720 may be configured to removably couple to the bayonet 710 to axially align the external lens 740 and the lens barrel 706 along the optical axis 718. Additionally, the retaining ring 722 may be configured to conceal the bayonet 710 from view from a position exterior to the image capture device 704. By way of example, the axial portion 730 of the retaining ring 722 may extend parallel to the optical axis 718 of the lens barrel 706 towards the body 750 of the image capture device 704. As a result, the axial portion 730 may at least partially conceal the bayonet 710 from a position exterior of the axial portion 730. Similarly, the radial portion 724 of the retaining ring 722 may extend radially inward from the axial portion 730 towards the optical axis 718 of the lens barrel 706, thereby also at least partially concealing the bayonet 710 from view from a position external of the image capture device 704.

An internal portion of the retaining ring 722 may facilitate engagement between the retaining ring 722 and the bayonet 710 to at least partially conceal the bayonet 710 as described above. The internal portion of the retaining ring 722 may be or may include the spring plate 734. The spring plate 734 may be configured to engage the fingers 714 of the bayonet 710. The spring plate 734 may be coupled to, or integrally formed with, the retaining ring 722. The spring plate 734 may the similar to the spring plate 634 described above. The spring plate 734 may extend from the retaining ring 722 to engage the fingers 714 of the bayonet 710.

For example, the spring plate 734 may extend radially inward toward the optical axis 718 and the fingers 714 of the bayonet 710 may extend radially outward away from the optical axis 718. As a result, the spring plate 734 and the fingers 714 may extend toward one another along substantially parallel or nonparallel planes so that the fingers 714 may engage the spring plate 734. Additionally, similar to the spring plate 634 shown in FIG. 6, the spring plate 734 may include the forward surface 736 and the opposing rearward surface 738. The forward surface 736 may be configured to contact or otherwise engage the fingers 714 of the bayonet 710 while the rearward surface 738 remains substantially free of contact with the fingers 714 of the bayonet 710. The rearward surface 738 may also be positioned adjacent to, or in contact with, a portion of the body 750 of the image capture device 704.

The spring plate 734 and the retaining ring 722 may also form the channel 732. While a geometry of the channel 732 is not particularly limited, the channel 732 may be shaped to receive at least a portion of the fingers 714 of the bayonet 710. For example, the fingers 714 of the bayonet 710 may be configured to be positioned in the channel 732 when the replaceable lens module 720 is releasably coupled to the bayonet 710. As can be seen in FIG. 6, the replaceable lens module 720 may be configured to move towards the bayonet 710 along the optical axis 718 of the lens barrel 706 until the spring plate 734 is positioned axially between the body 750 of the image capture device 704 and bayonet 710. As discussed in further detail below, movement of the replaceable lens module 720 with respect to the image capture device 704 to removably couple the replaceable lens module 720 to the bayonet 710 may be along or parallel to the optical axis 718, may be lateral with respect to the optical axis 718, may be about the optical axis 718 (e.g., rotation of the replaceable lens module 720 about the optical axis 718), or a combination thereof. Thus, coupling and uncoupling of the replaceable lens module 720 with respect to the bayonet 710 may be completed in a variety of manners that may be determined by the configuration of the image capture devices 104, 204, 206, 304, 306, 404, 604, 704 described herein.

It may also be desirable to seal the image capture device 704 from moisture and/or debris to prevent the moisture and/or debris from entering the internal portions of the image capture device 704. To at least partially seal the image capture device 704, the lens barrel seal 744 discussed above may be disposed between the lens barrel 706 and the body 750 of the image capture device 704. To further seal the image capture device 704, the image capture device 704 may also include the replaceable lens module seal 748 positioned between the retaining ring 722 of the replaceable lens module 720 and the body 750 of the image capture device 704. The replaceable lens module seal 748 may be compressible between the retaining ring 722 and the body 750 of the image capture device 704 so that, when the replaceable lens module 720 is coupled to the bayonet 710, the retaining ring 722 may compress the replaceable lens module seal 748 to fill a gap between the retaining ring 722 and the body 750.

The replaceable lens module seal 748 may be disposed in any desired position between the retaining ring 722 and the body 750, the bayonet 710, or both. For example, the replaceable lens module seal 748 may be positioned between the axial portion 730 of the retaining ring 722 and the body 750 of the image capture device 704. In certain configurations, the replaceable lens module seal 748 may be located between the radial portion 724 of the retaining ring 722 and another portion of the image capture device 704. For example, the replaceable lens module seal 748 may be positioned between the retaining flange 728 of the radial portion 724 and the external lens 740 to prevent moisture and/or debris from entering the image capture device 704 between the retaining ring 722 and the external lens 740. It should also be noted that any number of seals may be present in the image capture device 704 and the image capture device 704 is not limited to the replaceable lens module seal 748 and the lens barrel seal 744.

As stated above, the replaceable lens module seal 748 may be positioned between the axial portion 730 of the retaining ring 722 and the body 750. The replaceable lens module seal 748 may extend annularly around all or a portion of the body 750. To prevent movement of the replaceable lens module seal 748 with respect to the body 750 and/or the retaining ring 722, the replaceable lens module seal 748 may be located within a groove 752 of the body 750 of the image capture device 704. The groove 752 may be complimentary in shape to the replaceable lens module seal 748 to maintain the position of the replaceable lens module seal 748.

Figure 7B:
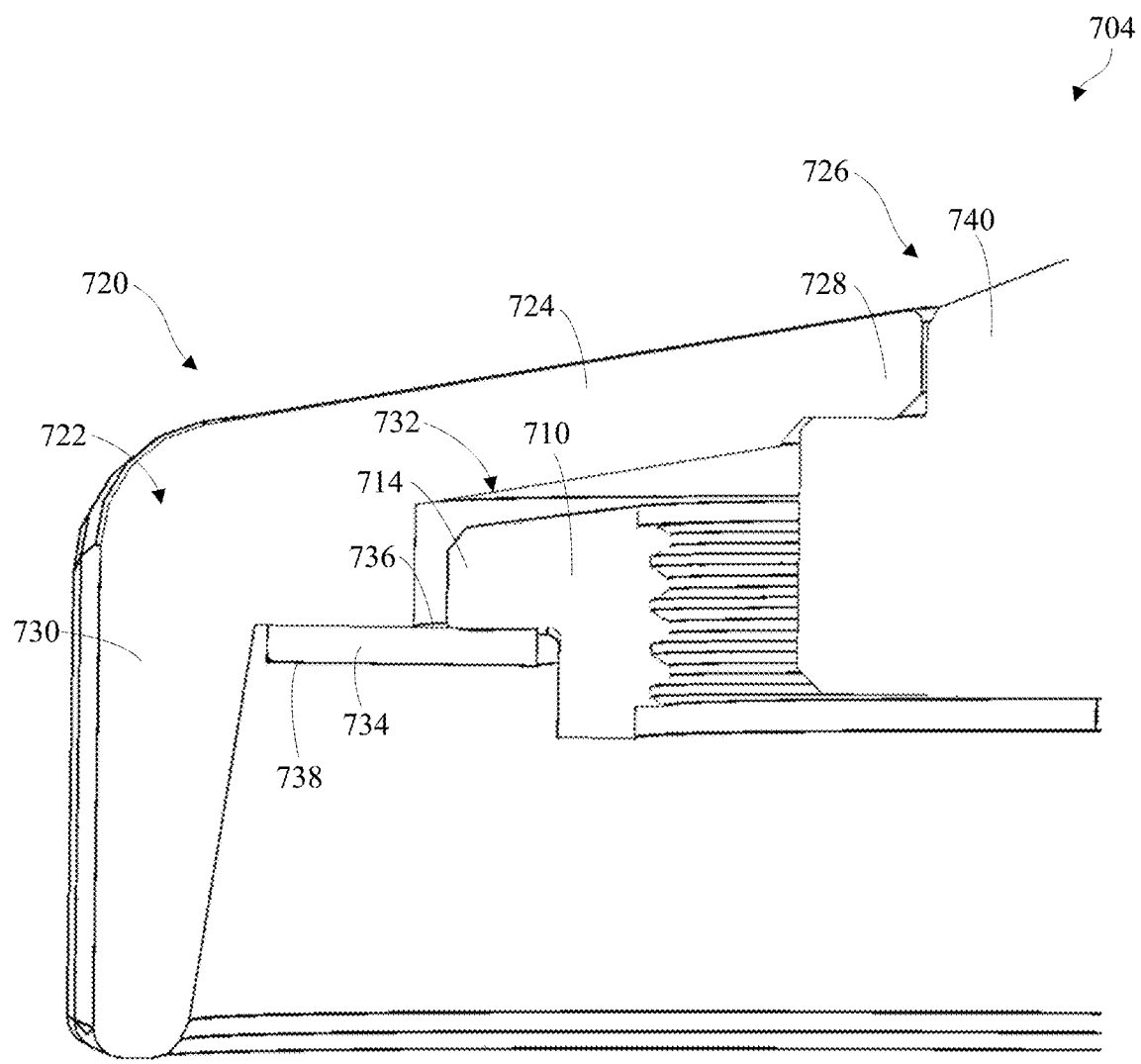
FIG. 7B is a close-up cross-sectional view of the replaceable lens module of FIG. 7A.

FIG. 7B a close-up cross-sectional view of the replaceable lens module 720 of FIG. 7A. The lens barrel 706 and the body 750 of the image capture device 704 have been removed for simplicity.

As discussed above, the channel 732 may be located between the spring plate 734 and the retaining ring 722. To removably couple the replaceable lens module 720 to the bayonet 710, the fingers 714 of the bayonet 710 may be positioned between the radial portion 724 of the retaining ring 722 and the spring plate 734 so that at least a portion of the fingers 714 are positioned in the channel 732. The fingers 714 may contact the forward surface 736 of the spring plate 734 so that the spring plate 734 is positioned between the bayonet 710 and the body 750 of the image capture device 704. To couple the replaceable lens module 720 to bayonet 710 and axially align the external lens 740 to the optical axis 718 of the lens barrel 706, the external lens 740 may be positioned in a lens recess 742 of the lens barrel 706, as shown in FIG. 7A. The external lens 740 may be positioned in the opening 726 disposed in the retaining ring 722 so that the retaining flange 728 of the retaining ring 722 engages the external lens 740 and maintains an axial position of the external lens 740 with respect to the optical axis 718. As discussed above with respect to the external lens 640, the retaining flange 728 may be keyed, notched, or otherwise complimentary in shape to a portion of the external lens 640 to prevent lateral movement of the external lens 640 with respect to the optical axis 718.

To further retain the external lens 740 in the desired position with respect to the lens barrel 706, the spring plate 734 may be formed of a material that is configured to flex and/or deflect without permanent deformation of the spring plate 734. The spring plate 734 may be integrally formed with the retaining ring 722 or may be coupled to the retaining ring 722. As a result, the spring plate 734 may be formed from the same material as the retaining ring 722 or may be formed from a different material. For example, the retaining ring 722 may be formed from a plastic material and the spring plate 734 may be formed from one or more metals, or vice versa.

Due to the flexibility of the spring plate 734, the spring plate 734 may be configured to elastically deform when engaged to the fingers 714 of the bayonet 710 to exert a biasing force on the retaining ring 722 and/or the replaceable lens module seal 748 to retain the external lens 740 (e.g., the removable lens) between the retaining ring 722 and the lens barrel 706. That is, the spring plate 734 may bias the retaining ring 722 towards the lens barrel 706 and the bayonet 710, and thus also bias the external lens 740 towards the lens barrel 706. As a result, the radial portion 724 of the retaining ring 722—and in particular, the retaining flange 728—may compress the external lens 740 towards the lens barrel to sandwich the external lens 740 between the retaining ring 722 and the lens barrel 706. Additionally, the spring plate 734 exerting the biasing force on the retaining ring 722 may also advantageously improve engagement between the spring plate 734 and the bayonet 710 by creating a friction fit between the bayonet 710 and the spring plate 734. As a result, the spring plate 734 may prevent unwanted disengagement between the replaceable lens module 720 and the bayonet 710 that may occur during normal operation of the image capture device 704.

Figure 8:
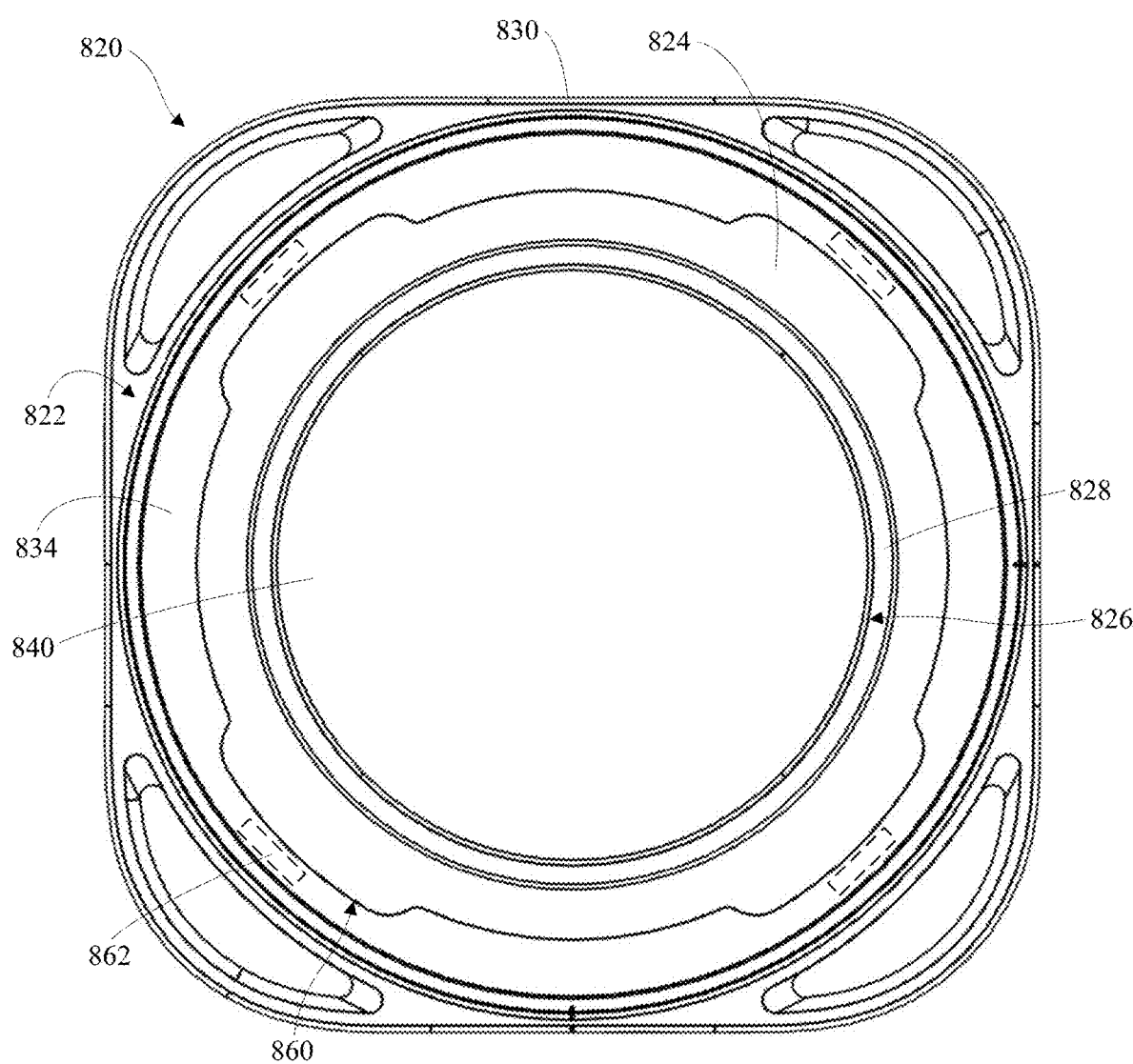
FIG. 8 is a planar view of a replaceable lens module.

FIG. 8 is a planar view of a replaceable lens module 820. The replaceable lens module 820 may be similar to the replaceable lens modules 620, 720 described above. Additionally, the replaceable lens module 820 may be configured to be coupled to the image capture devices 104, 204, 206, 304, 306, 404, 604, 704 described above.

The replaceable lens module 820 may include a retaining ring 822 similar to the retaining rings 622, 722. The retaining ring 822 may include a radial portion 824 having an opening 826 and an axial portion 830 that form an overall geometry of the retaining ring 822. The radial portion 824 may also include a retaining flange 828. Additionally, a spring plate 834 may be coupled to the retaining ring 822. Furthermore, an external lens 840 may be disposed in the opening 826 to facilitate axial alignment between the external lens 840 and a lens barrel of an image capture device, such as the lens barrels 606, 706 described above.

The spring plate 834 may be similar to the spring plates 634, 734 described above. The spring plate 834 may be formed with or attached to the retaining ring 822, such as an interior surface of the radial portion 824 and/or the axial portion 830 of the retaining ring 822. For example, the spring plate 834 may be coupled to the retaining ring 822 in one or more connection regions 862. The connection region(s) 862 may locations along the retaining ring 822 where the spring plate 834 is mechanically and/or chemically attached to the retaining ring 822. For example, the spring plate 834 may be laser welded, adhered (e.g., glued), heat-staked, threaded, fastened, injection molded, overmolded, or otherwise joined to the retaining ring 822 in the connection region(s) 862. It is also envisioned that the connection region(s) 862 may be minimal in size to avoid obstruction of the channel formed between the spring plate 834 and the retaining ring 822, such as the channels 632, 732 described above. It should be noted that the connection region(s) 862 are hidden in FIG. 8 due to being positioned between the spring plate 834 and the retaining ring 822. As such, the connection region(s) 862 have been illustrated as dashed lines.

As discussed above, the replaceable lens module 820 may be configured to move towards a lens barrel and a bayonet coupled to the lens barrel to removably couple the replaceable lens module 820 to the bayonet by locating fingers of the bayonet, such as the fingers 614, 714 described above, in a channel formed between the spring plate 834 and the retaining ring 822.

To position the fingers of the bayonet within the channel, the spring plate 834 may include one or more finger notches 860. The finger notch(es) 860 may be a cutout or removal of material along the spring plate 834 that may receive the fingers of the bayonet. The fingers of the bayonet may be configured to be inserted into the finger notch(es) 860 to position the fingers in the channel of the retaining ring 822, as shown in FIGS. 6, 7A, and 7B. For example, the finger notch(es) 860 may be configured to align with and receive the fingers of the bayonet when the replaceable lens module 820 is moved towards the lens barrel along and about an optical axis of the lens barrel (e.g., the optical axis 618, 718 described above). The replaceable lens module 820 may be configured to rotate with respect to the bayonet when the fingers of the bayonet are received by the finger notch(es) 860 to position the fingers in the channel formed between the spring plate 834 and the retaining ring 822, at which point the spring plate 834 may engage the fingers and removably couple the replaceable lens module 820 to the bayonet. As a result, the spring plate 834 may beneficially create a friction fit with the bayonet so that a position of the replaceable lens module 820 may be maintained during operation of the image capture device and the replaceable lens module 820 may still easily be disconnected if desired.

Figure 9:
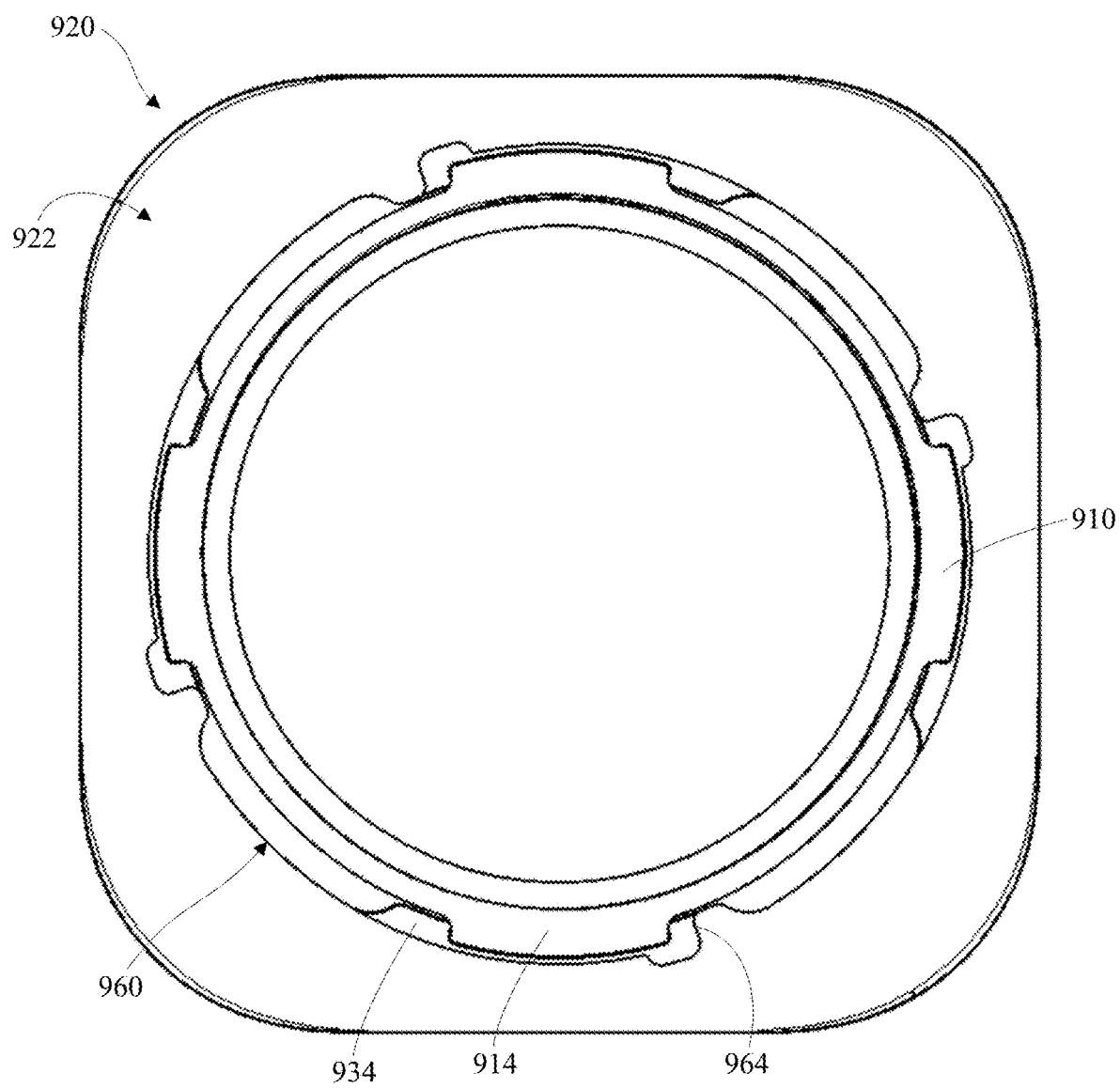
FIG. 9 is a planar view of a replaceable lens module coupled to a bayonet of an image capture device.

FIG. 9 is a planar view of a bayonet 910 having a plurality of fingers 914 coupled to a replaceable lens module 920 an image capture device. The replaceable lens module 920 may be similar to the replaceable lens modules 620, 720, 820 described above. As discussed above, the replaceable lens module 920 may be configured to removably couple to the bayonet 910 of an image capture device, such as the image capture devices 104, 204, 206, 304, 306, 404, 604, 704 described above. A retaining ring 922 of the replaceable lens module 920 may be configured to removably couple the replaceable lens module 920 to the bayonet 910.

The plurality of fingers 914 may be annularly disposed around a central region of the bayonet and/or around an optical axis of the image capture device (e.g., the optical axis 618, 718 shown in FIGS. 6 and 7A). As shown in FIG. 9, the fingers 914 may be equally spaced apart annularly around the bayonet 910 and may be configured to engage a spring plate 934 coupled to the retaining ring 922 of the replaceable lens module 920. To engage the spring plate 934, the fingers 914 of the bayonet 910 may be first initially inserted into finger notches 960 along the spring plate by moving the replaceable lens module 920 axially towards the bayonet 910, or vice versa, along the optical axis of the image capture device. The finger notches 960 of the spring plate 934 may be similar to the finger notches 860 shown in FIG. 8. Additionally, the finger notches 960 of the spring plate 934 may be complimentary in shape to the fingers 914 of the bayonet 910. For example, the finger notches 960 may have a similar shape to the fingers 914, the finger notches 960 may be oversized compared to the fingers 914, or both to facilitate insertion of the fingers 914 into the finger notches 960.

Once the fingers 914 are inserted into the finger notches 960 of the spring plate 934, the replaceable lens module 920 may be rotated about the optical axis with respect to the bayonet 910, or vice versa, until the fingers 914 are positioned in a channel located between the retaining ring 922 and the spring plate 934, such as a channel similar to the channels 632, 732 discussed above.

The channel of the replaceable lens module 920 may include one or more channel stops 964. The replaceable lens module 920 may be configured to rotate with respect to the bayonet 910 until the fingers 914 of the bayonet 910 abut the channel stop(s) 964 or are otherwise prevented from rotating any further with respect to the bayonet 910. Each of the fingers 914 may abut a respective one of the channel stop(s) 964 or only a portion of the fingers 914 may abut the channel stop(s) 964. A shape of the channel stop(s) 964 may not be particularly limited. Additionally, the channel stop(s) 964 may provide a rotational stopping point for the replaceable lens module 920 with respect to the bayonet 910. Furthermore, the channel stop(s) 964 may also provide tactile feedback when coupling the replaceable lens module 920 to the bayonet 910 so that an installer of the replaceable lens module 920 tactilely knows when to stop rotating the replaceable lens module 920 with respect to the bayonet 910.

Figure 10:
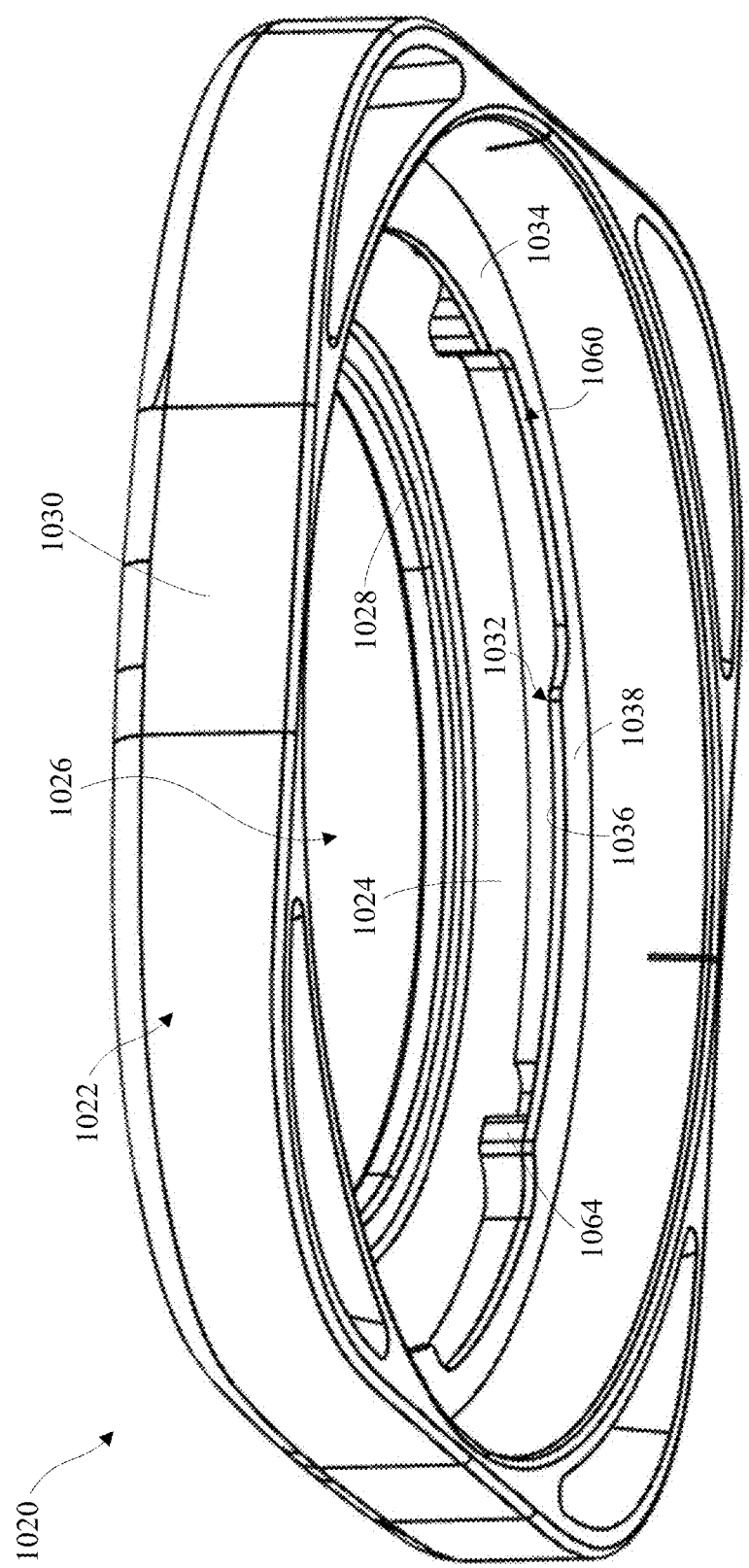
FIG. 10 is an isometric view of a replaceable lens module.

FIG. 10 is an isometric view of a replaceable lens module 1020. The replaceable lens module 1020 may similar to the replaceable lens module 620, 720, 820, 920 discussed above.

The replaceable lens module 1020 may include a retaining ring 1022 similar to the retaining rings 622, 722, 822, and 922 discussed above. The retaining ring 1022 may include a radial portion 1024 having an opening 1026 and a retaining flange 1028 at least partially surrounding the opening 1026. The radial portion 1024 may be connected to, or integrally formed with, an axial portion 1030. The radial portion 1024 and the axial portion 1030 may at least partially form an interior region configured to couple with a bayonet and/or a lens barrel of an image capture device, such as those shown in FIGS. 6, 7A, 7B, 8, and 9. The interior region may also include a channel 1032 configured to receive a portion of the bayonet.

A spring plate 1034 which may be similar to the spring plates 634, 734, 834, and 934 described above may be coupled to or formed with the retaining ring 1022. The spring plate 1034 may be located at least partial within the interior region formed by the axial portion 1030 and the radial portion 1024. Additionally, the spring plate 1034 may be positioned to avoid obstruction of the opening 1026 located within the retaining ring 1022, whereby the opening 1026 may be configured to position and/or partially secure a lens (e.g., an external lens, such as the external lenses 640, 740, 840 discussed above). For example, the lens may be disposed in the opening 1026 of the retaining ring 1022, and the retaining flange 1028 at least partially surrounding the opening 1026 may maintain a position of the lens with respect to the retaining ring 1022 when the replaceable lens module 1020 is secured to the bayonet of the image capture device.

The spring plate 1034 may extend inwardly from the retaining ring 1022 towards an axis of the opening 1026 so that the spring plate 1034 and the retaining ring 1022 form the channel 1032 therebetween. For example, a forward surface 1036 of the spring plate 1034 and the radial portion 1024 of the spring plate 1034 may form the channel 1032 so that fingers of the bayonet may be positioned within the channel 1032 and may contact the forward surface 1036 when the replaceable lens module 1020 is removably coupled to the bayonet. An opposing rearward surface 1038 of the spring plate 1034 may be free of contact with the bayonet when the replaceable lens module 1020 is removably couple to the bayonet. Such coupling can be seen in FIGS. 6, 7A, 7B, and 9.

The spring plate 1034 may include finger notches 1060 that are configured to receive the fingers of the bayonet so that the fingers may extend beyond the spring plate 1034 when the replaceable lens module 1020 is moved towards the bayonet. Once the fingers of the bayonet are inserted into the finger notches 1060, the replaceable lens module 1020 may be rotated with respect to the bayonet so that the fingers are positioned within the channel 1032 formed between the spring plate 1034 and the retaining ring 1022. Additionally, the replaceable lens module 1020 may continue to rotate with respect to the bayonet until the fingers of the bayonet reach channel stops 1064 positioned in the channel 1032, at which point the replaceable lens module 1020 may be prevented from further rotation with respect to the bayonet. In such a position, the replaceable lens module 1020 may be removably coupled to the bayonet so that the lens positioned in the opening 1026 of the retaining ring 1022 is axially aligned with the lens barrel of the image capture device, include one or more internal lenses disposed in the lens barrel.

The methods and techniques of a replaceable lens module having a spring plate as described herein, or aspects thereof, may be implemented by an image capture apparatus, or one or more components thereof, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, or the image capture apparatus 500 shown in FIG. 5. The methods and techniques of a replaceable lens module having a spring plate as described herein, or aspects thereof, may be implemented by an image capture device, such as the image capture device 104 shown in FIGS. 1A-1B, one or more of the image capture devices 204, 206 shown in FIGS. 2A-2B, one or more of the image capture devices 304, 306 shown in FIG. 3, the image capture device 404 shown in FIGS. 4A-4B, or an image capture device of the image capture apparatus 500 shown in FIG. 5.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device, comprising:
a lens barrel disposed in a body of the image capture device;
a bayonet coupled to the lens barrel and that includes one or more fingers that project outward from the bayonet; and
a replaceable lens module configured to releasably couple to the bayonet and that includes:
a retaining ring;
a lens positioned in an opening of the retaining ring; and
a spring plate coupled to an interior surface of the retaining ring and configured to engage the one or more fingers of the bayonet to releasably couple the replaceable lens module to the bayonet, wherein the spring plate is configured to elastically deform when the spring plate engages the one or more fingers of the bayonet to compress the replaceable lens module towards the lens barrel.

2. The image capture device of claim 1, wherein the spring plate extends radially inward from the retaining ring towards an optical axis of the lens barrel to engage the one or more fingers of the bayonet.

3. The image capture device of claim 2, wherein the retaining ring includes:
an axial portion that extends substantially parallel to the optical axis of the lens barrel; and
a radial portion that extends radially inward towards the optical axis of the lens barrel.

4. The image capture device of claim 3, wherein the radial portion of the retaining ring includes a retaining flange that at least partially surrounds the opening of the retaining ring, and wherein the retaining flange is configured to contact the lens and position the lens with respect to the lens barrel.

5. The image capture device of claim 1, wherein the spring plate and the retaining ring form a channel, and wherein the one or more fingers of the bayonet are configured to be positioned in the channel when the replaceable lens module is releasably coupled to the bayonet.

6. The image capture device of claim 5, wherein the spring plate includes one or more finger notches, and wherein the one or more fingers of the bayonet are configured to be inserted into the one or more finger notches to position the one or more fingers in the channel.

7. The image capture device of claim 1, wherein the replaceable lens module is configured to axially align the lens of the replaceable lens module and the lens barrel of the image capture device.

8. An image capture device, comprising:
a lens barrel disposed in a body of the image capture device and that includes one or more internal lenses disposed in the lens barrel;
a bayonet coupled to the lens barrel;
a replaceable lens module configured to removably couple to the bayonet and that includes:
a retaining ring;
an external lens positioned in an opening of the retaining ring; and
a spring plate coupled to, or integrally formed with, the retaining ring, the spring plate configured to engage the bayonet and elastically deform to create a friction fit between the bayonet and the spring plate; and
a seal positioned between the retaining ring of the replaceable lens module and the body of the image capture device.

9. The image capture device of claim 8, wherein the replaceable lens module is movable along and about an optical axis of the lens barrel to couple the replaceable lens module to the bayonet.

10. The image capture device of claim 9, wherein the spring plate includes one or more finger notches, and wherein the one or more finger notches are configured to align with and receive one or more fingers of the bayonet when the replaceable lens module is moved towards the lens barrel along and about the optical axis.

11. The image capture device of claim 10, wherein the replaceable lens module further comprises:
a channel located between the spring plate and the retaining ring, wherein the replaceable lens module is configured to rotate with respect to the bayonet when the one or more fingers of the bayonet are received by the one or more finger notches of the spring plate to position the one or more fingers in the channel.

12. The image capture device of claim 11, wherein the channel includes one or more channel stops, and wherein the replaceable lens module is configured to rotate with respect to the bayonet until the one or more fingers of the bayonet abut the one or more channel stops.

13. The image capture device of claim 8, wherein the seal is located within a groove of the body of the image capture device.

14. The image capture device of claim 8, wherein the retaining ring includes an axial portion that extends parallel to an optical axis of the lens barrel towards the body of the image capture device, and wherein the seal is positioned between the axial portion of the retaining ring and the body of the image capture device.

15. The image capture device of claim 8, wherein the bayonet includes a lens recess configured to receive the external lens of the replaceable lens module.

16. A replaceable lens module for an image capture device, the replaceable lens module comprising:
a retaining ring configured to removably couple the replaceable lens module to a bayonet of the image capture device, wherein the bayonet includes one or more fingers that project radially with respect to an optical axis of a lens barrel;
an opening disposed in the retaining ring;
a replaceable lens disposed in the opening, wherein the replaceable lens is configured to be aligned to the optical axis of the lens barrel of the image capture device using the retaining ring;
a spring plate that extends from the retaining ring and is configured to engage the one or more fingers of the bayonet; and
a seal compressible between the retaining ring and a body of the image capture device,
wherein the spring plate is configured to elastically deform when engaged to the one or more fingers of the bayonet to exert a biasing force on the retaining ring and the seal to retain the replaceable lens between the retaining ring and the lens barrel.

17. The replaceable lens module of claim 16, wherein the spring plate and the one or more fingers extend toward one another along substantially parallel planes.

18. The replaceable lens module of claim 16, wherein the replaceable lens module is configured to move towards the bayonet along the optical axis of the lens barrel until the spring plate is positioned axially between the body of the image capture device and the bayonet.

19. The replaceable lens module of claim 16, wherein the retaining ring is configured to conceal the bayonet of the image capture device from view from a position exterior to the image capture device.

20. The replaceable lens module of claim 19, wherein the spring plate includes a forward surface and an opposing rearward surface, and wherein the forward surface of the spring plate is coupled to the retaining ring and configured to contact the one or more fingers of the bayonet.

* * * * *